US008650897B2

(12) United States Patent
Honda

(10) Patent No.: US 8,650,897 B2
(45) Date of Patent: Feb. 18, 2014

(54) HEAT PUMP SYSTEM

(75) Inventor: Masahiro Honda, Oostende (BE)

(73) Assignee: Daikin Industries, Ltd., Osaka (JP)

( * ) Notice: Subject to any disclaimer, the term of this patent is extended or adjusted under 35 U.S.C. 154(b) by 351 days.

(21) Appl. No.: 13/202,628

(22) PCT Filed: Feb. 23, 2010

(86) PCT No.: PCT/JP2010/001181
§ 371 (c)(1),
(2), (4) Date: Aug. 22, 2011

(87) PCT Pub. No.: WO2010/098070
PCT Pub. Date: Sep. 2, 2010

(65) Prior Publication Data
US 2011/0302949 A1 Dec. 15, 2011

(30) Foreign Application Priority Data

Feb. 24, 2009 (JP) ................................ 2009-041322

(51) Int. Cl.
*F25B 13/00* (2006.01)
(52) U.S. Cl.
USPC .................................. 62/324.1; 62/324.6
(58) Field of Classification Search
USPC .......... 62/324.6, 324.1, 160, 238.7, 428, 126, 62/277, 408, 434
See application file for complete search history.

(56) References Cited

U.S. PATENT DOCUMENTS

| 2,343,467 | A | * | 3/1944 | McGrath | 165/226 |
|---|---|---|---|---|---|
| 2,982,523 | A | * | 5/1961 | McFarlan | 165/62 |
| 4,015,962 | A | * | 4/1977 | Tompkins | 62/175 |
| 4,327,561 | A | * | 5/1982 | McNeal et al. | 62/324.1 |
| 6,347,528 | B1 | * | 2/2002 | Iritani et al. | 62/324.6 |
| 8,245,948 | B2 | * | 8/2012 | Cho et al. | 237/12.1 |
| 2005/0103488 | A1 | * | 5/2005 | Ichishi et al. | 165/202 |
| 2007/0234752 | A1 | * | 10/2007 | Otake et al. | 62/324.6 |
| 2008/0197206 | A1 | * | 8/2008 | Murakami et al. | 237/2 B |

(Continued)

FOREIGN PATENT DOCUMENTS

| JP | 61-223463 A | 10/1986 |
|---|---|---|
| JP | 2-82067 A | 3/1990 |

(Continued)

OTHER PUBLICATIONS

International Preliminary Report of corresponding PCT Application No. PCT/JP2010/001181.
International Search Report of corresponding PCT Application No. PCT/JP2010/001181.

*Primary Examiner* — Mohammad M Ali
(74) *Attorney, Agent, or Firm* — Global IP Counselors

(57) ABSTRACT

A heat pump system includes a first usage unit operable to perform a hot-water supply operation to heat an aqueous medium and a second usage unit operable to perform air-cooling and air-warming operations to cool or heat an air medium. The first and second usage units are both connected to a heat source unit in such a manner that the first and second usage units are incapable of individually selecting and performing a hot-water supply operation, an air-cooling operation, or an air-warming operation. The heat pump system is capable of switching operation to a thermoregulation mode different from the switched state of a heat-source-side switching mechanism in response to a thermoregulation mode command issued by a first usage-side controller, a second usage side controller or a centralized controller.

17 Claims, 7 Drawing Sheets

(56) References Cited

U.S. PATENT DOCUMENTS

| | | | |
|---|---|---|---|
| 2008/0235977 A1* | 10/2008 | Kuwabara | 34/77 |
| 2010/0229583 A1* | 9/2010 | Komori et al. | 62/238.7 |
| 2010/0282434 A1* | 11/2010 | Yabuuchi et al. | 165/63 |
| 2012/0180508 A1* | 7/2012 | Endoh et al. | 62/159 |

FOREIGN PATENT DOCUMENTS

| | | |
|---|---|---|
| JP | 9-210505 A | 8/1997 |
| JP | 2000-46417 A | 2/2000 |
| JP | 2004-218944 A | 8/2004 |

* cited by examiner

HEAT PUMP SYSTEM

CROSS-REFERENCE TO RELATED APPLICATIONS

This U.S. National stage application claims priority under 35 U.S.C. §119(a) to Japanese Patent Application No. 2009-041322, filed in Japan on Feb. 24, 2009, the entire contents of which are hereby incorporated herein by reference.

TECHNICAL FIELD

The present invention relates to a heat pump system, and particularly relates to a heat pump system in which a usage unit for performing a hot-water supply operation of heating an aqueous medium and a usage unit for performing cooling and heating of an air medium are connected to a shared heat source unit.

BACKGROUND ART

In the past, there have been heat pump-type hot-water floor heating apparatuses such as the one disclosed in Japanese Laid-open Patent Publication No. 2000-46417, which has a hot water heat exchanger connected to a floor heating panel and an indoor heat exchanger for performing indoor air-warming. Such a heat pump-type hot-water floor heating apparatus is configured primarily by connecting both a hot water heat exchanger and an indoor heat exchanger to a shared compressor, a four-way switching valve, an outdoor heat exchanger, and other components.

SUMMARY

Consideration has been given to using the above-described conventional heat pump-type hot-water floor heating apparatus for indoor air-cooling and air-warming with the indoor heat exchanger, and to connecting a hot water storage unit either with the floor heating panel or instead of the floor heating panel to the hot water heat exchanger and using the apparatus for hot water supply as well. In this case, in view of the differences between the objectives of indoor air cooling and heating by cooling/heating air and hot water supply including floor heating or the like by heating water, either an indoor air cooling and heating controller and a hot water supply controller must be provided and one of the controllers must be given the function of operating the four-way switching valve, or a centralized controller for operating the four-way switching valve must be provided and the four-way switching valve must be operated when switching among indoor air cooling, indoor air warming, and hot water supply. However, since users simply recognize such a heat pump system as being both an air-cooling and air-warming apparatus and a hot water supply apparatus, users fail to recognize the necessity of operating the four-way switching valve and forget to operate the four-way switching valve, operational mistakes may occur, and operating the four-way switching valve is complicated.

Thus, in a heat pump system in which a usage unit for performing a hot-water supply operation of heating an aqueous medium and a usage unit for performing cooling and heating of an air medium are connected to a shared heat source unit, not only must the usage units themselves be operated, but the switched state of the four-way switching valve, which is the thermoregulation mode of the entire system, must be switched as well; therefore, there is a risk that the desired operation will not be successfully performed due to the operation being complicated, the switching of the thermoregulation mode being forgotten, or mistakes in the switching.

An object of the present invention is to ensure that a switch will be made to a thermoregulation mode suitable for the desired operation in a heat pump system in which a usage unit for performing a hot-water supply operation of heating an aqueous medium and a usage unit for performing cooling and heating of an air medium are both connected to a shared heat source unit.

A heat pump system according to a first aspect of the present invention comprises a heat source unit, and a first usage unit and second usage unit connected to the heat source unit. The heat source unit has a compressor for compressing a refrigerant, a heat-source-side heat exchanger, and a heat-source-side switching mechanism capable of switching between a radiating operation state in which the heat-source-side heat exchanger is made to function as a radiator of refrigerant and an evaporating operation state in which the heat-source-side heat exchanger is made to function as an evaporator of refrigerant. The first usage unit has a first usage-side heat exchanger that functions as a radiator of refrigerant when the heat-source-side switching mechanism is in the evaporating operation state, and the first usage unit is capable of performing a hot-water supply operation for heating an aqueous medium by the heat radiation of the refrigerant in the first usage-side heat exchanger. The second usage unit has a second usage-side heat exchanger that functions as an evaporator of refrigerant when the heat-source-side switching mechanism is in the radiating operation state and that functions as a radiator of refrigerant when the heat-source-side switching mechanism is in the evaporating operation state, and the second usage unit is capable of performing an air-cooling operation of cooling an air medium by the evaporation of the refrigerant in the second usage-side heat exchanger, as well as performing an air-warming operation of heating the air medium by the heat radiation of the refrigerant in the second usage-side heat exchanger. In this heat pump system, the first usage unit and the second usage unit are incapable of individually selecting and operating the hot-water supply operation, the air-cooling operation, or the air-warming operation; and the heat pump system is capable of switching to and operating in a thermoregulation mode different from the switched state of the heat-source-side switching mechanism as the thermoregulation mode issued by command by a first usage-side controller for issuing commands to the first usage unit, a second usage-side controller for issuing commands to the second usage unit, or a centralized controller that is separate from the first usage-side controller and the second usage-side controller.

In this heat pump system, the first usage-side controller for issuing commands to the first usage unit, the second usage-side controller for issuing commands to the second usage unit, or the centralized controller which is separate from the first usage-side controller and the second usage-side controller issues commands in the following manner. When only the hot-water supply operation is performed, for example, the thermoregulation mode is switched to the evaporating operation state while the first usage unit is operated by the command of the first usage-side controller. When only the air-cooling operation is performed, the thermoregulation mode is switched to the radiating operation state while the second usage unit is operated by the command of the second usage-side controller. When only the air-warming operation is performed, the thermoregulation mode is switched to the evaporating operation state while the second usage unit is operated by the command of the second usage-side controller. When both the hot-water supply operation and the air-warming operation are performed, the thermoregulation mode is switched to the evaporating operation state while the first usage unit is operated by the command of the first usage-side controller and the second usage unit is operated by the command of the second usage-side controller. While the thermoregulation mode remains switched to the radiating operation state, the hot-water supply operation and the air-warming operation cannot be performed, and while the thermoregulation mode remains switched to the evaporating operation state, the air-cooling operation cannot be performed.

Thus, in order to perform the desired operations in the first usage unit and the second usage unit, not only must there be a hot-water supply operation command from the first usage-side controller to the first usage unit and an air-cooling operation or air-warming operation command from the second usage-side controller to the second usage unit, but there must also be a switch in the thermoregulation mode, which is the switched state of the heat-source-side switching mechanism which determines the operation state in the heat source unit shared by the first and second usage units. This means that in this heat pump system, the first usage unit and the second usage unit are incapable of individually selecting and operating the hot-water supply operation, the air-cooling operation, or the air-warming operation.

In view of this, with this heat pump system, it is possible to switch and operate a thermoregulation mode different from the switched state of the heat-source-side switching mechanism as the thermoregulation mode issued by command by either the first usage-side controller for issuing commands to the first usage unit, the second usage-side controller for issuing commands to the second usage unit, or the centralized controller which is separate from the first usage-side controller and the second usage-side controller.

It is thereby possible in this heat pump system to switch to a thermoregulation mode suitable for the desired operation without the user performing an operation (command) of switching the thermoregulation mode, such as when the thermoregulation mode is switched to the evaporating operation state in the case that, e.g., the hot-water supply operation is performed with the thermoregulation mode having been switched to the radiating operation state.

A heat pump system according to a second aspect of the present invention is the heat pump system according to the first aspect, wherein when a command for the hot-water supply operation is issued from the first usage-side controller to the first usage unit while the thermoregulation mode is in the radiating operation state, the thermoregulation mode is switched to the evaporating operation state and a priority hot-water supply operation is performed, which is an operation in which a hot-water supply operation of the first usage unit is performed.

In this heat pump system, when a command for the hot-water supply operation is issued from the first usage-side controller to the first usage unit while the thermoregulation mode is in the radiating operation state, the hot-water supply operation of the first usage unit can be performed by switching the thermoregulation mode from the radiating operation state to the evaporating operation state, and it is therefore possible to perform the hot-water supply operation as necessary without the user performing an operation (command) of switching the thermoregulation mode to the evaporating operation state, even during summer or other operating conditions in which the air-cooling operation is needed.

A heat pump system according to a third aspect of the present invention is the heat pump system according to the second aspect, wherein the air-cooling operation of the second usage unit is prohibited during the priority hot-water supply operation.

When the thermoregulation mode is switched from the radiating operation state to the evaporating operation state in order to perform the priority hot-water supply operation, the second usage unit is switched to a state of performing the air-warming operation. In cases in which the second usage unit performs the air-cooling operation until the priority hot-water supply operation is initiated, the second usage unit goes into a state of performing the air-warming operation, and when a command for the air-cooling operation is issued from the second usage-side controller to the second usage unit during the priority hot-water supply operation, the air-warming operation is initiated, which compromises the level of comfort within the room and is undesirable.

In view of this, in this heat pump system, the air-cooling operation of the second usage unit is prohibited when the priority hot-water supply operation is being performed.

It is thereby possible with this heat pump system to prevent the level of comfort in the room from being compromised when the priority hot-water supply operation is performed.

A heat pump system according to a fourth aspect of the present invention is the heat pump system according to the third aspect, wherein the second usage unit further has a usage-side fan for feeding an air medium to the second usage-side heat exchanger, and the usage-side fan is operated while the air-cooling operation has been stopped during the priority hot-water supply operation in the second usage unit which has received a command for the air-cooling operation from the second usage-side controller.

In this heat pump system, since the air-cooling operation of the second usage unit is prohibited during the priority hot-water supply operation, when operation of the usage-side fan is stopped at this time in the second usage unit which has received a command for the air-cooling operation from the second usage-side controller, there is a risk of the user misinterpreting that there is a malfunction of the second usage unit.

In view of this, in this heat pump system, during the priority hot-water supply operation, the usage-side fan is operated while the air-cooling operation has been stopped in the second usage unit which has received a command for the air-cooling operation from the second usage-side controller.

It is thereby possible with this heat pump system to ensure that the user does not misinterpret that there is a malfunction of the second usage unit due to the priority hot-water supply operation being performed.

A heat pump system according to a fifth aspect of the present invention is the heat pump system according to the fourth aspect, wherein the second usage-side controller continues a display stating that the air-cooling operation is in effect even while the air-cooling operation of the second usage unit has stopped during the priority hot-water supply operation.

In this heat pump system, when the display of the operation state of the second usage unit in the second usage-side controller is changed in conjunction with the air-cooling operation of the second usage unit being stopped during the priority hot-water supply operation, there is a risk of the user misinterpreting that there is a malfunction of the second usage unit.

In view of this, in this heat pump system, the second usage-side controller continues to display that the air-cooling operation is in effect even while the air-cooling operation of the second usage unit has stopped during the priority hot-water supply operation.

It is thereby possible with this heat pump system to ensure that the user does not misinterpret that there is a malfunction of the second usage unit due to the priority hot-water supply operation being performed.

A heat pump system according to a sixth aspect of the present invention is the heat pump system according to any of the first through fifth aspects, wherein switching of the thermoregulation mode is performed based on at least one of the command thermoregulation mode and the outside air temperature.

In this heat pump system, switching of the thermoregulation mode can be performed appropriately because switching of the thermoregulation mode is performed based on at least one of the commanded thermoregulation mode and the outside air temperature.

A heat pump system according to a seventh aspect of the present invention is the heat pump system according to any of the first through sixth aspects, wherein the first usage unit is connected to the heat source unit so that when the heat-source-side switching mechanism is in the radiating operation state, the second usage-side heat exchanger can be made to function as an evaporator of refrigerant and the first usage-side heat exchanger can be made to function as a radiator of refrigerant.

In this heat pump system, since the first usage unit is connected to the heat source unit so that the second usage-side heat exchanger can be made to function as an evaporator of refrigerant and the first usage-side heat exchanger can be made to function as a radiator of refrigerant even when the thermoregulation mode is the radiating operation state, when an exhaust heat hot-water supply operation is performed in which both the hot-water supply operation and the air-cooling operation are performed, the thermoregulation mode is switched to the radiating operation state, while an operation of the first usage unit is performed by a command of the first usage-side controller and an operation of the second usage unit is performed by a command of the second usage-side controller.

However, when such an exhaust heat hot-water supply operation is performed, a hot-water supply operation is performed according to the heat radiation load in the first usage-side heat exchanger that is proportionate to the evaporation load in the second usage-side heat exchanger, and it is therefore sometimes not possible to provide for the desired hot water supply load, in which case the thermoregulation mode must be switched to the evaporating operation state to perform the hot-water supply operation. The air-cooling operation and air-warming operation are sometimes performed as necessary during other times such as spring or autumn as well, in which case the thermoregulation mode must be switched.

Thus, the thermoregulation mode must be switched even with a configuration such as that of this heat pump system in which the exhaust heat hot-water supply operation can be performed, which means that the first usage unit and the second usage unit are incapable of individually selecting and operating the hot-water supply operation, the air-cooling operation, and the air-warming operation in this heat pump system as well.

In view of this, it is possible in this heat pump system as well to switch to and operate a thermoregulation mode different from the switched state of the heat-source-side switching mechanism as the thermoregulation mode issued by command by either the first usage-side controller for issuing commands to the first usage unit, the second usage-side controller for issuing commands to the second usage unit, or the centralized controller which is separate from the first usage-side controller and the second usage-side controller.

It is thereby possible in this heat pump system to switch to a thermoregulation mode suitable for the desired operation without the user performing an operation (command) of switching the thermoregulation mode.

A heat pump system according to an eighth aspect of the present invention is the heat pump system according to any of the first through seventh aspects, wherein switching of the thermoregulation mode is performed by the second usage-side controller.

In this heat pump system, since it is preferable to be able to switch operation to a thermoregulation mode different from the commanded thermoregulation mode, essentially, the switching of the thermoregulation mode may be performed by either the first usage-side controller, the second usage-side controller, or the centralized controller.

However, switching of the thermoregulation mode is performed frequently when the centralized controller is made to perform switching of the thermoregulation mode, e.g., when the thermoregulation mode is left switched to the evaporating operation state, the thermoregulation mode is switched to the radiating operation state every time the air-cooling operation of the second usage unit is performed in operating conditions such as summer when the air-cooling operation is needed, and when the thermoregulation mode is left switched to the radiating operation state, the thermoregulation mode is switched to the evaporating operation state every time the air-warming operation of the second usage unit is performed in operating conditions such as winter when the air-warming operation is needed. When the first usage-side controller is made to perform switching of the thermoregulation mode, the thermoregulation mode is usually left switched to the evaporating operation state; therefore, every time the air-cooling operation of the second usage unit is performed in operating conditions such as summer when the air-cooling operation is needed, the thermoregulation mode is switched to the radiating operation state and the thermoregulation mode is switched frequently. Thus, it is undesirable to make the first usage-side controller or the centralized controller perform switching of the thermoregulation mode because there is a risk that the thermoregulation mode will be frequently switched.

In view of this, in this heat pump system, the thermoregulation mode is switched by the second usage-side controller, whereby the thermoregulation mode is left switched to the radiating operation state in operating conditions such as summer when the air-cooling operation is needed, and the thermoregulation mode is left switched to the evaporating operation state in operating conditions such as winter when the air-warming operation is needed.

It is thereby possible with this heat pump system to prevent the thermoregulation mode from being switched frequently.

DESCRIPTION OF EMBODIMENTS

Embodiments of the heat pump system according to the present invention will be described based on the drawings.

First Embodiment

Configuration

—Overall Configuration—

Figure 1:
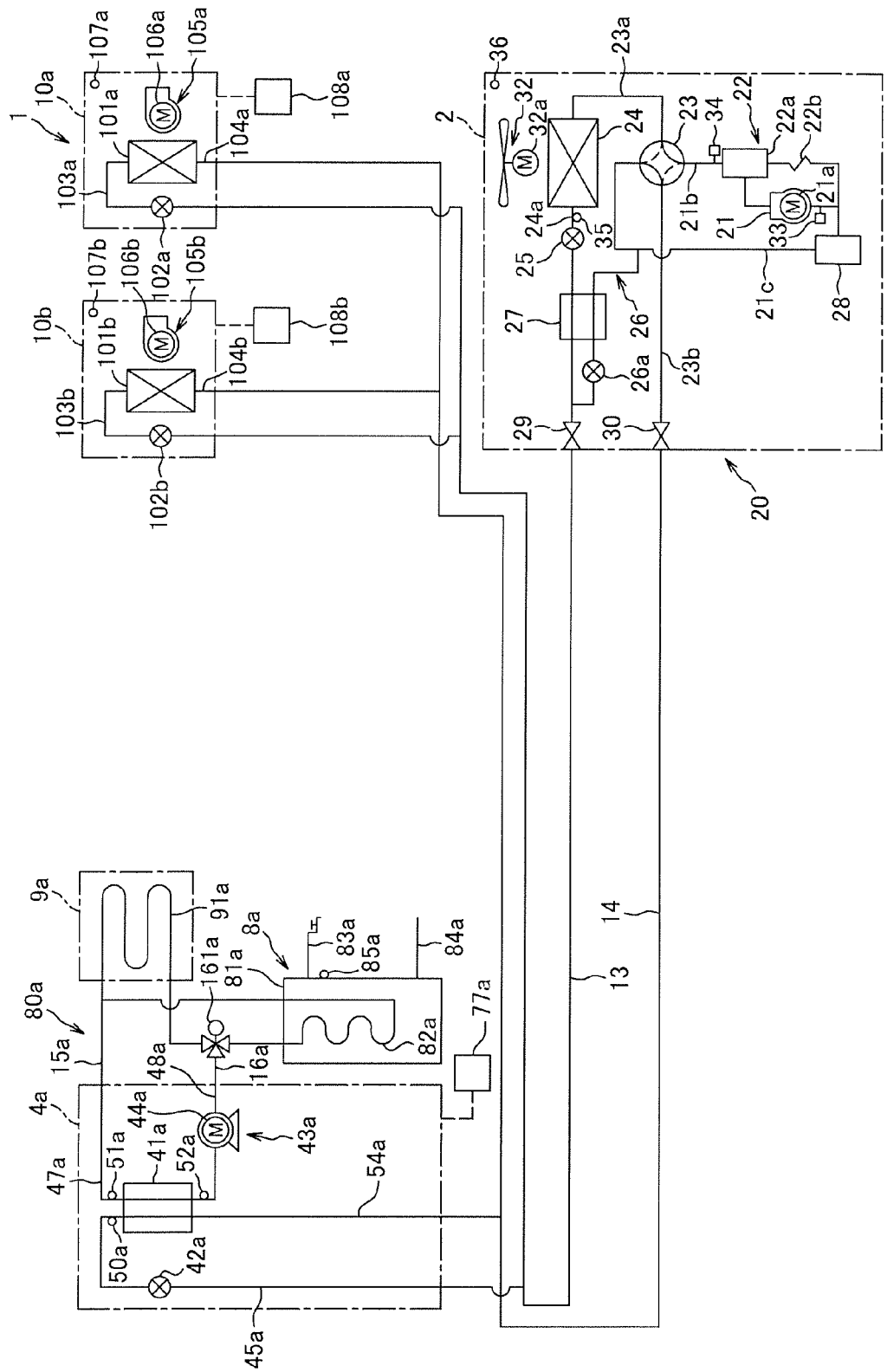
FIG. 1 is a schematic structural diagram of a heat pump system according to the first embodiment of the present invention.

FIG. 1 is a view showing the general configuration of a heat pump system 1 according to a first embodiment of the present invention. The heat pump system 1 is an apparatus capable of operation for heating an aqueous medium, and other operation by utilizing a vapor compression heat pump cycle.

The heat pump system 1 comprises primarily a heat source unit 2, a first usage unit 4a, second usage units 10a, 10b, a liquid refrigerant communication tube 13, a gas refrigerant communication tube 14, a hot-water storage unit 8a, a hot-water air-warming unit 9a, an aqueous medium communication tube 15a, and an aqueous medium communication tube 16a; wherein the heat source unit 2, the first usage unit 4a, and the second usage units 10a, 10b are connected via the liquid refrigerant communication tubes 13, 14, thereby constituting a heat-source-side refrigerant circuit 20; and the first usage unit 4a, the hot-water storage unit 8a, and the hot-water air-warming unit 9a are connected via the aqueous medium communication tubes 15a, 16a, thereby constituting an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility with respect to the HFC-based refrigerant is enclosed for lubrication of a heat-source-side compressor 21 (described later). Water is used as the aqueous medium in the aqueous medium circuit 80a.

—Heat Source Unit—

The heat source unit 2 is disposed outdoors and connected to the usage units 4a, 10a, 10b via the refrigerant communication tubes 13, 14, constituting a portion of the heat-source-side refrigerant circuit 20.

The heat source unit 2 has primarily a heat-source-side compressor 21, an oil separation mechanism 22, a heat-source-side switching mechanism 23, a heat-source-side heat exchanger 24, a heat-source-side expansion valve 25, an intake return tube 26, a subcooler 27, a heat-source-side accumulator 28, a liquid-side shutoff valve 29, and a gas-side shutoff valve 30.

The heat-source-side compressor 21 is a mechanism for compressing the heat-source-side refrigerant. The heat-source-side compressor 21 used herein is an airtight compressor in which a rotary-type, scroll-type, or other positive-displacement compression element (not shown) housed in a casing (not shown) is driven by a heat-source-side compressor motor 21a which is also housed in the casing. A high-pressure space (not shown) filled by the heat-source-side refrigerant after compression in the compression element is formed inside the casing of the heat-source-side compressor 21, and refrigeration machine oil is stored in the high-pressure space. The rotation speed (i.e., the operating frequency) of the heat-source-side compressor motor 21a can be varied by an inverter apparatus (not shown), and the capacity of the heat-source-side compressor 21 can thereby be controlled.

The oil separation mechanism 22 is a mechanism for separating refrigeration machine oil included in the heat-source-side refrigerant that is discharged from the heat-source-side compressor 21 and returning the refrigeration machine oil to the intake of the heat-source-side compressor. The oil separation mechanism 22 has primarily an oil separator 22a provided to a heat-source-side discharge tube 21b of the heat-source-side compressor 21; and an oil return tube 22b for connecting the oil separator 22a and a heat-source-side intake tube 21c of the heat-source-side compressor 21. The oil separator 22a is a device for separating refrigeration machine oil included in the heat-source-side refrigerant that is discharged from the heat-source-side compressor 21. The oil return tube 22b has a capillary tube, and is a refrigerant tube for returning the refrigeration machine oil separated from the heat-source-side refrigerant in the oil separator 22a to the heat-source-side intake tube 21c of the heat-source-side compressor 21.

The heat-source-side switching mechanism 23 is a four-way switching valve capable of switching between a heat-source-side radiating operation state in which the heat-source-side heat exchanger 24 functions as a radiator of the heat-source-side refrigerant, and a heat-source-side evaporating operation state in which the heat-source-side heat exchanger 24 functions as a evaporator of the heat-source-side refrigerant. The heat-source-side switching mechanism 23 is connected to the heat-source-side discharge tube 21b, the heat-source-side intake tube 21c, a first heat-source-side gas refrigerant tube 23a connected to the gas side of the heat-source-side heat exchanger 24, and a second heat-source-side gas refrigerant tube 23b connected to the gas-side shutoff valve 30. The heat-source-side switching mechanism 23 is capable of switching for communicating the heat-source-side discharge tube 21b with the first heat-source-side gas refrigerant tube 23a, and communicating the second heat-source-side gas refrigerant tube 23b with the heat-source-side intake tube 21c (this switching corresponding to the heat-source-side radiating operation state, indicated by solid lines in the heat-source-side switching mechanism 23 in FIG. 1). The heat-source-side switching mechanism 23 is also capable of switching for communicating the heat-source-side discharge tube 21b with the second heat-source-side gas refrigerant tube 23b, and communicating the first heat-source-side gas refrigerant tube 23a with the heat-source-side intake tube 21c (this switching corresponding to the heat-source-side evaporating operation state, indicated by dashed lines in the heat-source-side switching mechanism 23 in FIG. 1). The heat-source-side switching mechanism 23 is not limited to a four-way switching valve, and may configured so as to have a function for switching the same directions of heat-source-side refrigerant flow as those described above, through the use of a combination of a plurality of solenoid valves or the like, for example.

The heat-source-side heat exchanger 24 is a heat exchanger for functioning as a radiator or evaporator of the heat-source-side refrigerant by exchanging heat between the heat-source-side refrigerant and outdoor air. A heat-source-side liquid refrigerant tube 24a is connected to the liquid side of the heat-source-side heat exchanger 24, and the first heat-source-side gas refrigerant tube 23a is connected to the gas side thereof. The outdoor air for heat exchange with the heat-source-side refrigerant in the heat-source-side heat exchanger 24 is fed by a heat-source-side fan 32 which is driven by a heat-source-side fan motor 32a.

The heat-source-side expansion valve 25 is an electrical expansion valve for performing such functions as depressurizing the heat-source-side refrigerant flowing through the heat-source-side heat exchanger 24, and is provided to the heat-source-side liquid refrigerant tube 24a.

The intake return tube 26 is a refrigerant tube for diverting a portion of the heat-source-side refrigerant flowing through the heat-source-side liquid refrigerant tube 24a and returning the diverted refrigerant to the intake of the heat-source-side compressor 21, and in the present embodiment, one end of the intake return tube 26 is connected to the heat-source-side liquid refrigerant tube 24a, and the other end is connected to the heat-source-side intake tube 21c. An intake return expansion valve 26a, the opening degree of which can be controlled, is provided to the intake return tube 26. The intake return expansion valve 26a is composed of an electrical expansion valve.

The subcooler 27 is a heat exchanger for exchanging heat between the heat-source-side refrigerant flowing through the heat-source-side liquid refrigerant tube 24a and the heat-source-side refrigerant flowing through the intake return tube 26 (more specifically, the heat-source-side refrigerant that has been depressurized by the intake return expansion valve 26a).

The heat-source-side accumulator 28 is provided to the heat-source-side intake tube 21c, and is a container for temporarily storing the heat-source-side refrigerant circulated through the heat-source-side refrigerant circuit 20 before the heat-source-side refrigerant is drawn into the heat-source-side compressor 21 from the heat-source-side intake tube 21c.

The liquid-side shutoff valve 29 is a valve provided at the connection between the heat-source-side liquid refrigerant tube 24a and the liquid refrigerant communication tube 13. The gas-side shutoff valve 30 is a valve provided at the connection between the second heat-source-side gas refrigerant tube 23b and the gas refrigerant communication tube 14.

Various sensors are provided to the heat source unit 2. Specifically, the heat source unit 2 is provided with a heat-source-side intake pressure sensor 33 for detecting a heat-source-side intake pressure Ps1, which is the pressure of the heat-source-side refrigerant in the intake of the heat-source-side compressor 21; a heat-source-side discharge pressure sensor 34 for detecting a heat-source-side discharge pressure Pd1, which is the pressure of the heat-source-side refrigerant in the discharge of the heat-source-side compressor 21; a heat-source-side heat exchange temperature sensor 35 for detecting a heat-source-side heat exchanger temperature Thx, which is the temperature of the heat-source-side refrigerant in the liquid side of the heat-source-side heat exchanger 24; and an outdoor air temperature sensor 36 for detecting an outdoor air temperature To.

—Liquid Refrigerant Communication Tube—

The liquid refrigerant communication tube 13 is connected to the heat-source-side liquid refrigerant tube 24a via the liquid-side shutoff valve 29, and the liquid refrigerant communication tube 13 is a refrigerant tube capable of directing the heat-source-side refrigerant to the outside of the heat source unit 2 from the outlet of the heat-source-side heat exchanger 24 which functions as a radiator of the heat-source-side refrigerant when the heat-source-side switching mechanism 23 is in the heat-source-side radiating operation state. The liquid refrigerant communication tube 13 is also a refrigerant tube capable of introducing the heat-source-side refrigerant from outside the heat source unit 2 into the inlet of the heat-source-side heat exchanger 24 which functions as an evaporator of the heat-source-side refrigerant when the heat-source-side switching mechanism 23 is in the heat-source-side evaporating operation state.

—Gas Refrigerant Communication Tube—

The gas refrigerant communication tube 14 is connected to the second heat-source-side gas refrigerant tube 23b via the gas-side shutoff valve 30. The gas refrigerant communication tube 14 is a refrigerant tube capable of introducing the heat-source-side refrigerant into the intake of the heat-source-side compressor 21 from outside the heat source unit 2 when the heat-source-side switching mechanism 23 is in the heat-source-side radiating operation state. The gas refrigerant communication tube 14 is also a refrigerant tube capable of directing the heat-source-side refrigerant to the outside of the heat source unit 2 from the discharge of the heat-source-side compressor 21 when the heat-source-side switching mechanism 23 is in the heat-source-side evaporating operation state.

—First Usage Unit—

The first usage unit 4a is disposed indoors and connected to the heat source unit 2 and the second usage units 10a, 10b via the refrigerant communication tubes 13, 14, constituting a portion of the heat-source-side refrigerant circuit 20. The first usage unit 4a is also connected to the hot-water storage unit 8a and the hot-water air-warming unit 9a via the aqueous medium communication tubes 15a, 16a, constituting a portion of the aqueous medium circuit 80a.

The first usage unit 4a has primarily a first usage-side heat exchanger 41a, a first usage-side flow rate adjustment valve 42a, and a circulation pump 43a.

The first usage-side heat exchanger 41a is a heat exchanger for functioning as a radiator of the heat-source-side refrigerant by exchanging heat between the heat-source-side refrigerant and the aqueous medium, a first usage-side liquid refrigerant tube 45a is connected to the liquid side of the flow passage through which the heat-source-side refrigerant flows, a first usage-side discharge refrigerant tube 46a is connected to the gas side of the flow passage through which the heat-source-side refrigerant flows, a first usage-side water inlet tube 47a is connected to the inlet side of the flow passage through which the aqueous medium flows, and a first usage side water outlet tube 48a is connected to the outlet side of the flow passage through which the aqueous medium flows. The liquid refrigerant communication tube 13 is connected to the first usage-side liquid refrigerant tube 45a, the discharge refrigerant communication tube 12 is connected to the first usage-side discharge refrigerant tube 46a, the aqueous medium communication tube 15a is connected to the first usage-side water inlet tube 47a, and the aqueous medium communication tube 16a is connected to the first usage-side water outlet tube 48a.

The first usage-side flow rate adjustment valve 42a is an electrical expansion valve whereby the flow rate of heat-source-side refrigerant flowing through the first usage-side heat exchanger 41a can be varied by controlling the opening degree of the first usage-side flow rate adjustment valve 42a, and the first usage-side flow rate adjustment valve 42a is provided to the first usage-side liquid refrigerant tube 45a.

The first usage-side discharge refrigerant tube 46a is provided with a first usage-side discharge non-return valve 49a for allowing the heat-source-side refrigerant to flow toward the first usage-side heat exchanger 41a from the discharge refrigerant communication tube 12 and preventing the heat-source-side refrigerant from flowing toward the discharge refrigerant communication tube 12 from the first usage-side heat exchanger 41a.

The circulation pump 43a is a mechanism for pressurizing the aqueous medium, and the circulation pump 43a used herein is a pump in which a centrifugal and/or positive-displacement pump element (not shown) is driven by a circulation pump motor 44a. The circulation pump 43a is provided to the first usage-side water outlet tube 48a. The rotation speed (i.e., the operating frequency) of the circulation pump motor 44a can be varied by an inverter apparatus (not shown), and the capacity of the circulation pump 43a can thereby be controlled.

The first usage unit 4a is thereby configured so that a hot-water supply operation can be performed in which the first usage-side heat exchanger 41a is caused to function as a radiator of the heat-source-side refrigerant introduced from the discharge refrigerant communication tube 12, whereby the heat-source-side refrigerant radiated in the first usage-side heat exchanger 41a is directed to the liquid refrigerant communication tube 13, and the aqueous medium is heated by radiation of the heat-source-side refrigerant in the first usage-side heat exchanger 41a.

Various sensors are provided to the first usage unit 4a. Specifically, the first usage unit 4a is provided with a first usage-side heat exchange temperature sensor 50a for detecting a first usage-side refrigerant temperature Tsc1, which is the temperature of the heat-source-side refrigerant in the liquid side of the first usage-side heat exchanger 41a; an aqueous medium inlet temperature sensor 51a for detecting an aqueous medium inlet temperature Twr, which is the temperature of the aqueous medium in the inlet of the first usage-side heat exchanger 41a; and an aqueous medium outlet temperature sensor 52a for detecting an aqueous medium outlet temperature Tw1, which is the temperature of the aqueous medium in the outlet of the first usage-side heat exchanger 41a.

—Hot-Water Storage Unit—

The hot-water storage unit 8a is installed indoors, is connected to the first usage unit 4a via the aqueous medium communication tubes 15a, 16a, and constitutes a portion of the aqueous medium circuit 80a.

The hot-water storage unit 8a has primarily a hot-water storage tank 81a and a heat exchange coil 82a.

The hot-water storage tank 81a is a container for storing water as the aqueous medium for the hot water supply, a hot-water supply tube 83a for sending the aqueous medium as hot water to a faucet, shower, or the like is connected to the top of the hot-water storage tank 81a, and a water supply tube 84a for replenishing the aqueous medium expended by the hot-water supply tube 83a is connected to the bottom of the hot-water storage tank 81a.

The heat exchange coil 82a is provided inside the hot-water storage tank 81a, and is a heat exchanger for functioning as a heater of the aqueous medium in the hot-water storage tank 81a by exchanging heat between the aqueous medium circulating through the aqueous medium circuit 80a and the aqueous medium inside the hot-water storage tank 81a. The aqueous medium communication tube 16a is connected to the inlet of the heat exchange coil 82a, and the aqueous medium communication tube 15a is connected to the outlet thereof.

The hot-water storage unit 8a is thereby capable of heating the aqueous medium inside the hot-water storage tank 81a through the use of the aqueous medium circulating through the aqueous medium circuit 80a, which has been heated in the first usage unit 4a, and storing the heated aqueous medium as hot water. The type of hot-water storage unit 8a used herein is a hot-water storage unit for storing, in a hot-water storage tank, the aqueous medium heated by heat exchange with the aqueous medium heated in the first usage unit 4a, but a type of hot-water storage unit for storing an aqueous medium heated in the first usage unit 4a in a hot-water storage tank may also be used.

Various sensors are also provided to the hot-water storage unit 8a. Specifically, the hot-water storage unit 8a is provided with a hot-water storage temperature sensor 85a for detecting a hot-water storage temperature Twh, which is the temperature of the aqueous medium stored in the hot-water storage tank 81a.

—Hot-Water Air-Warming Unit—

The hot-water air-warming unit 9a is installed indoors, is connected to the first usage unit 4a via the aqueous medium communication tubes 15a, 16a, and constitutes a portion of the aqueous medium circuit 80a.

The hot-water air-warming unit 9a has primarily a heat exchange panel 91a, and is composed of a radiator and/or a floor heating panel and other components.

The heat exchange panel 91a is provided alongside a wall or elsewhere indoors when configured as a radiator, and is provided under the floor or elsewhere indoors when configured as a floor heating panel. The heat exchange panel 91a is a heat exchanger for functioning as a radiator or heater of the aqueous medium circulated through the aqueous medium circuit 80a, and the aqueous medium communication tube 16a is connected to the inlet of the heat exchange panel 91a, and the aqueous medium communication tube 15a is connected to the outlet of the heat exchange panel 91a.

—Aqueous Medium Communication Tubes—

The aqueous medium communication tube 15a is connected to the outlet of the heat exchange coil 82a of the hot-water storage unit 8a, and the outlet of the heat exchange panel 91a of the hot-water air-warming unit 9a. The aqueous medium communication tube 16a is connected to the inlet of the heat exchange coil 82a of the hot-water storage unit 8a, and the inlet of the heat exchange panel 91a of the hot-water air-warming unit 9a. The aqueous medium communication tube 16a is provided with an aqueous-medium-side switching mechanism 161a capable of switching between feeding the aqueous medium circulated through the aqueous medium circuit 80a to both the hot-water storage unit 8a and the hot-water air-warming unit 9a, or to any one of the hot-water storage unit 8a and the hot-water air-warming unit 9a. The aqueous-medium-side switching mechanism 161a is composed of a three-way valve.

—Second Usage Units—

The second usage units 10a, 10b are disposed indoors and are connected to the heat source unit 2 via the refrigerant communication tubes 13, 14, constituting a portion of the heat-source-side refrigerant circuit 20.

The second usage unit 10a has primarily a second usage-side heat exchanger 101a and a second usage-side flow rate adjustment valve 102a.

The second usage-side heat exchanger 101a is a heat exchanger for functioning as a radiator or evaporator of the heat-source-side refrigerant by exchanging heat between the heat-source-side refrigerant and indoor air as the air medium, a second usage-side liquid refrigerant tube 103a is connected to the liquid side of the second usage-side heat exchanger 101a, and a second usage-side gas refrigerant tube 104a is connected to the gas side of the second usage-side heat exchanger 101a. The liquid refrigerant communication tube 13 is connected to the second usage-side liquid refrigerant tube 103a, and the gas refrigerant communication tube 14 is connected to the second usage-side gas refrigerant tube 104a. The air medium for exchanging heat with the heat-source-side refrigerant in the second usage-side heat exchanger 101a is fed by a usage-side fan 105a driven by a usage-side fan motor 106a. The rotating speed (i.e. the operating frequency) of the usage-side fan motor 106a can be varied by an inverter device (not shown), whereby the capacity of the usage-side fan 105a can be controlled.

The second usage-side flow rate adjustment valve 102a is an electrical expansion valve whereby the flow rate of heat-source-side refrigerant flowing through the second usage-side heat exchanger 101a can be varied by controlling the opening degree of the second usage-side flow rate adjustment valve 102a, and the second usage-side flow rate adjustment valve 102a is provided to the second usage-side liquid refrigerant tube 103a.

The second usage unit 10a is thereby configured so that an air-cooling operation can be performed in which the second usage-side heat exchanger 101a is caused to function as an evaporator of the heat-source-side refrigerant introduced from the liquid refrigerant communication tube 13 in the heat-source-side radiating operation state of the heat-source-side switching mechanism 23, whereby the heat-source-side refrigerant evaporated in the second usage-side heat exchanger 101a is directed to the gas refrigerant communication tube 14, and the air medium is cooled by evaporation of the heat-source-side refrigerant in the second usage-side heat exchanger 101a. The second usage unit 10a is also configured so that an air-warming operation can be performed in which the second usage-side heat exchanger 101a is caused to function as a radiator of the heat-source-side refrigerant introduced from the gas refrigerant communication tube 14 in the heat-source-side evaporating operation state of the heat-source-side switching mechanism 23, whereby the heat-source-side refrigerant radiated in the second usage-side heat exchanger 101a is directed to the liquid refrigerant communication tube 13, and the air medium is heated by radiation of the heat-source-side refrigerant in the second usage-side heat exchanger 101a.

Various sensors are provided to the second usage unit 10a. Specifically, the second usage unit 10a is provided with an outdoor temperature sensor 107a for detecting an outdoor temperature Tr.

Since the configuration of the second usage unit 10b is identical to the configuration of the second usage unit 10a, for the configuration of the second usage unit 10b, the letters "a" in the reference symbols indicating components of the second usage unit 10a are replaced by the letters "b," and descriptions of these components are omitted.

—First Usage-Side Controller—

The heat pump system 1 is provided with a first usage-side controller 77a for implementing control settings and issuing control commands for the hot-water supply operation of the first usage unit 4a, and this controller is communicably connected to the first usage unit 4a.

—Second Usage-Side Controller—

The heat pump system 1 is provided with a second usage-side controller 108a for implementing control settings and issuing control commands for the air-cooling operation and air-warming operation of the second usage unit 10a, as well as a second usage-side controller 108b for implementing control settings and issuing control commands for the air-cooling operation and air-warming operation of the second usage unit 10b, and these controllers are communicably connected to the second usage units 10a, 10b.

The heat pump system 1 is also provided with a control part (not shown) for performing the following operations and various controls by the settings and commands of the first and second usage-side controllers.

<Operation>

Next, the operation of the heat pump system 1 will be described.

The operations of the heat pump system 1 include a hot-water supply operation for performing only the hot-water supply operation (i.e. operation of the hot-water storage unit 8a and/or the hot-water air-warming unit 9a) of the first usage unit 4a, an air-cooling operation for performing only the air-cooling operation of the second usage unit 10a and/or the second usage unit 10b, an air-warming operation for performing only the air-warming operation of the second usage unit 10a and/or the second usage unit 10b, and a hot-water supply/air-warming operation for performing the hot-water supply operation of the first usage unit 4a as well as the air-warming operation of the second usage unit 10a and/or the second usage unit 10b.

The operation in the four operations of the heat pump system 1 are described hereinbelow.

—Hot-Water Supply Operation—

In the case of performing only the hot-water supply operation of the first usage unit 4a, the heat-source-side switching mechanism 23 is switched to the heat-source-side evaporating operation state (indicated by dashed lines in the heat-source-side switching mechanism 23 in FIG. 1), and the intake return expansion valve 26a and the second usage-side flow rate adjustment valves 102a, 102b are closed in the heat-source-side refrigerant circuit 20. In the aqueous medium circuit 80a, the aqueous-medium-side switching mechanism 161a is switched to the state of feeding the aqueous medium to the hot-water storage unit 8a and/or the hot-water air-warming unit 9a. The switched state of the heat-source-side switching mechanism 23 as the thermoregulation mode is switched here to the heat-source-side evaporating operation state by one of the second usage-side controllers 108a, 108b, while an operation (hot-water supply operation) of the first usage unit 4a (and the hot-water storage unit 8a and/or the hot-water air-warming unit 9a) is performed by an operation command of the first usage-side controller 77a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration oil is separated from the high-pressure heat-source-side refrigerant discharged to the heat-source-side discharge tube 21b. The refrigeration oil separated from the heat-source-side refrigerant in the oil separator 22a is returned to the heat-source-side intake tube 21c through the oil return tube 22b. The high-pressure heat-source-side refrigerant from which the refrigeration oil has been separated is sent from the heat source unit 2 to the gas refrigerant communication tube 14 through the heat-source-side switching mechanism 23, the second heat-source-side gas refrigerant tube 23b, and the gas-side shutoff valve 30.

The high-pressure heat-source-side refrigerant sent to the gas refrigerant communication tube 14 is sent to the first usage unit 4a. The high-pressure heat-source-side refrigerant sent to the first usage unit 4a is sent to the first usage-side heat exchanger 41a through the first usage-side gas refrigerant tube 54a. Having been sent to the first usage-side heat exchanger 41a, the high-pressure heat-source-side refrigerant undergoes heat exchange in the first usage-side heat exchanger 41a with the air medium being circulated through the aqueous medium circuit 80a by the circulation pump 43a, and the heat-source-side refrigerant radiates heat. Having radiated heat in the first usage-side heat exchanger 41*a*, the high-pressure heat-source-side refrigerant is sent from the first usage unit 4*a* to the liquid refrigerant communication tube 13 through the first usage-side flow rate adjustment valve 42*a* and the first usage-side liquid refrigerant tube 45*a*.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24*a*. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23*a* and the heat-source-side switching mechanism 23. The low-pressure heat-source-side refrigerant sent to the heat-source-side accumulator 28 is again drawn into the heat-source-side compressor 21 through the heat-source-side intake tube 21*c*.

On the other hand, in the aqueous medium circuit 80*a*, the aqueous medium circulated through the aqueous medium circuit 80*a* is heated by radiation of the heat-source-side refrigerant in the first usage-side heat exchanger 41*a*. The aqueous medium heated in the first usage-side heat exchanger 41*a* is drawn into the circulation pump 43*a* through the first usage-side water outlet tube 48*a* and pressurized, and subsequently sent from the first usage unit 4*a* to the aqueous medium communication tube 16*a*. The aqueous medium sent to the aqueous medium communication tube 16*a* is sent to the hot-water storage unit 8*a* and/or the hot-water air-warming unit 9*a* through the aqueous-medium-side switching mechanism 161*a*. The aqueous medium sent to the hot-water storage unit 8*a* is heat-exchanged with the aqueous medium in the hot-water storage tank 81*a* and radiated in the heat exchange coil 82*a*, and the aqueous medium in the hot-water storage tank 81*a* is thereby heated. The aqueous medium sent to the hot-water air-warming unit 9*a* is radiated in the heat exchange panel 91*a*, the walls, the indoor floor and other indoor areas are thereby heated.

The operation in the hot-water supply operation for performing only the hot-water supply operation of the first usage unit 4*a* is thus performed.

—Air-Cooling Operation—

In the case of performing only the air-cooling operation of the second usage unit 10*a* and/or the second usage unit 10*b*, the heat-source-side switching mechanism 23 is switched to the heat-source-side radiating operation state (indicated by solid lines in the heat-source-side switching mechanism 23 in FIG. 1), and the first usage-side flow rate adjustment valve 42*a* is closed in the heat-source-side refrigerant circuit 20. The switched state of the heat-source-side switching mechanism 23 as the thermoregulation mode is switched to the heat-source-side radiating operation state by one of the second usage-side controllers 108*a*, 108*b*, and an operation (the air-cooling operation) of the second usage unit 10*a* and/or the second usage unit 10*b* is performed by an operation command of the second usage-side controller 108*a* and/or the second usage-side controller 108*b*.

In the heat-source-side refrigerant circuit 20 in such a state, the heat-source-side refrigerant at the low pressure in the refrigeration cycle is drawn into the heat-source-side compressor 21 through the heat-source-side intake tube 21*c* and compressed to the high pressure in the refrigeration cycle, and subsequently discharged to the heat-source-side discharge tube 21*b*. In the oil separator 22*a*, the refrigeration machine oil is separated from the high-pressure heat-source-side refrigerant discharged to the heat-source-side discharge tube 21*b*. The refrigeration machine oil separated from the heat-source-side refrigerant in the oil separator 22*a* is returned to the heat-source-side intake tube 21*c* through the oil return tube 22*b*. The high-pressure heat-source-side refrigerant from which the refrigeration machine oil has been separated is sent to the heat-source-side heat exchanger 24 through the heat-source-side switching mechanism 23 and the first heat-source-side gas refrigerant tube 23*a*. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24*a*, and is cooled to a subcooled state. The heat-source-side refrigerant flowing through the intake return tube 26 is returned to the heat-source-side intake tube 21*c*. The heat-source-side refrigerant cooled in the subcooler 27 is sent from the heat source unit 2 to the liquid refrigerant communication tube 13 through the heat-source-side liquid refrigerant tube 24*a* and the liquid-side shutoff valve 29.

The high-pressure heat-source-side refrigerant sent to the liquid refrigerant communication tube 13 is sent to the second usage units 10*a*, 10*b* (in this description, both of the second usage units 10*a*, 10*b* are performing the air-cooling operation). The high-pressure heat-source-side refrigerant sent to the second usage units 10*a*, 10*b* is sent to the second usage-side flow rate adjustment valves 102*a*, 102*b*. The high-pressure heat-source-side refrigerant sent to the second usage-side flow rate adjustment valves 102*a*, 102*b* is depressurized in the second usage-side flow rate adjustment valves 102*a*, 102*b* to a low-pressure gas-liquid two-phase state, and sent to the second usage-side heat exchangers 101*a*, 101*b* through the second usage-side liquid refrigerant tubes 103*a*, 103*b*. The low-pressure heat-source-side refrigerant sent to the second usage-side heat exchangers 101*a*, 101*b* undergoes heat exchange in the second usage-side heat exchangers 101*a*, 101*b* with the air medium fed by the usage-side fans 105*a*, 105*b* and the refrigerant evaporates, whereby indoor air cooling is performed. The low-pressure heat-source-side refrigerant evaporated in the second usage-side heat exchangers 101*a*, 101*b* is sent from the second usage units 10*a*, 10*b* to the gas refrigerant communication tube 14 through the second usage-side gas refrigerant tubes 104*a*, 104*b*.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23*b*, and the heat-source-side switching mechanism 23. The low-pressure heat-source-side refrigerant sent to the heat-source-side accumulator 28 is again drawn into the heat-source-side compressor 21 through the heat-source-side intake tube 21c.

The operation in the air-cooling operation for performing only the air-cooling operation of the second usage unit 10a and/or the second usage unit 10b is thus performed.

—Air-Warming Operation—

In the case of performing only the air-warming operation of the second usage unit 10a and/or the second usage unit 10b, the heat-source-side switching mechanism 23 is switched to the heat-source-side radiating operation state (indicated by dashed lines in the heat-source-side switching mechanism 23 in FIG. 1), and the intake return expansion valve 26a and the first usage-side flow rate adjustment valve 42a are closed in the heat-source-side refrigerant circuit 20. The switched state of the heat-source-side switching mechanism 23 as the thermoregulation mode is switched to the heat-source-side evaporating operation state by one of the second usage-side controllers 108a, 108b, and an operation (the air-warming operation) of the second usage unit 10a and/or the second usage unit 10b is performed by an operation command of the second usage-side controller 108a and/or the second usage-side controller 108b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. The high-pressure heat-source-side refrigerant from which the refrigeration machine oil has been separated is sent from the heat source unit 2 to the gas refrigerant communication tube 14 through the heat-source-side switching mechanism 23, the second heat-source-side gas refrigerant tube 23b, and the gas-side shutoff valve 30.

The high-pressure heat-source-side refrigerant sent to the gas refrigerant communication tube 14 is sent to the second usage units 10a, 10b (in this description, both of the second usage units 10a, 10b are performing the air-warming operation). The high-pressure heat-source-side refrigerant sent to the second usage units 10a, 10b is sent to the second usage-side heat exchangers 101a, 101b through the second usage-side gas refrigerant tubes 104a, 104b. The high-pressure heat-source-side refrigerant sent to the second usage-side heat exchangers 101a, 101b undergoes heat exchange in the second usage-side heat exchangers 101a, 101b with the air medium fed by the usage-side fans 105a, 105b and the refrigerant radiates heat, whereby indoor air warming is performed. Having radiated heat in the second usage-side heat exchangers 101a, 101b, the high-pressure heat-source-side refrigerant is sent from the second usage units 10a, 10b to the liquid refrigerant communication tube 13 through the second usage-side flow rate adjustment valves 102a, 102b and the second usage-side liquid refrigerant tubes 103a, 103b.

The heat-source-side refrigerant sent to the liquid refrigerant communication tube 13 is sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without exchanging heat. The heat-source-side refrigerant sent to the heat-source-side expansion valve 25 is depressurized in the heat-source-side expansion valve 25 to a low-pressure gas-liquid two-phase state, and sent to the heat-source-side heat exchanger 24 through the heat-source-side liquid refrigerant tube 24a. The low-pressure refrigerant sent to the heat-source-side heat exchanger 24 is heat-exchanged with the outdoor air fed by the heat-source-side fan 32 and evaporated in the heat-source-side heat exchanger 24. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

The operation in the air-warming operation for performing only the air-warming operation of the second usage unit 10a and/or the second usage unit 10b is thus performed.

—Hot-Water Supply/Air-Warming Operation—

In the case of performing the hot-water supply operation of the first usage unit 4a as well as the air-warming operation of the second usage unit 10a and/or the second usage unit 10b, the heat-source-side switching mechanism 23 is switched to the heat-source-side evaporating operation state (indicated by dashed lines in the heat-source-side switching mechanism 23 in FIG. 1), and the intake return expansion valve 26a is closed in the heat-source-side refrigerant circuit 20. In the aqueous medium circuit 80a, the aqueous-medium-side switching mechanism 161a is switched to a state in which the aqueous medium is fed to the hot-water storage unit 8a and/or the hot-water air-warming unit 9a. The switched state of the heat-source-side switching mechanism 23 as the thermoregulation mode is switched to the heat-source-side evaporating operation state by one of the second usage-side controllers 108a, 108b, an operation (the hot-water supply operation) of the first usage unit 4a (and the hot-water storage unit 8a and/or the hot-water air-warming unit 9a) is performed by an operation command of the first usage-side controller 77a, and an operation (the air-warming operation) of the second usage unit 10a and/or the second usage unit 10b is performed by an operation command of the second usage-side controller 108a and/or the second usage-side controller 108b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration oil is separated from the high-pressure heat-source-side refrigerant discharged to the heat-source-side discharge tube 21b. The refrigeration oil separated from the heat-source-side refrigerant in the oil separator 22a is returned to the heat-source-side intake tube 21c through the oil return tube 22b. The high-pressure heat-source-side refrigerant from which the refrigeration oil has been separated is sent from the heat source unit 2 to the gas refrigerant communication tube 14 through the heat-source-side switching mechanism 23, the second heat-source-side gas refrigerant tube 23b, and the gas-side shutoff valve 30.

The high-pressure heat-source-side refrigerant sent to the gas refrigerant communication tube 14 is sent to the first usage unit 4a and the second usage units 10a, 10b (in this description, both of the second usage units 10a, 10b are performing the air-warming operation).

The high-pressure heat-source-side refrigerant sent to the second usage units 10a, 10b is sent to the second usage-side heat exchangers 101a, 101b through the second usage-side gas refrigerant tubes 104a, 104b. The high-pressure heat-source-side refrigerant sent to the second usage-side heat exchangers 101a, 101b undergoes heat exchange in the second usage-side heat exchangers 101a, 101b with the air medium fed by the usage-side fans 105a, 105b and the refrigerant radiates heat, whereby indoor air warming is performed. Having radiated heat in the second usage-side heat exchangers 101a, 101b, the high-pressure heat-source-side refrigerant is sent from the second usage units 10a, 10b to the liquid refrigerant communication tube 13 through the second usage-side flow rate adjustment valves 102a, 102b and the second usage-side liquid refrigerant tubes 103a, 103b.

The high-pressure heat-source-side refrigerant sent to the first usage unit 4a is sent to the first usage-side heat exchanger 41a through the first usage-side gas refrigerant tube 54a. The high-pressure heat-source-side refrigerant sent to the first usage-side heat exchanger 41a undergoes heat exchange in the first usage-side heat exchanger 41a with the usage-side refrigerant at a low pressure in the refrigeration cycle circulating through the usage-side refrigerant circuit 40a, and the heat-source-side refrigerant radiates heat. Having radiated heat in the first usage-side heat exchanger 41a, the high-pressure heat-source-side refrigerant is sent from the first usage unit 4a to the liquid refrigerant communication tube 13 through the first usage-side flow rate adjustment valve 42a and the first usage-side liquid refrigerant tube 45a.

The heat-source-side refrigerant sent from the second usage units 10a, 10b and the first usage unit 4a to the liquid refrigerant communication tube 13 is merged in the liquid refrigerant communication tube 13 and sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without undergoing heat exchange. The heat-source-side refrigerant sent to the heat-source-side expansion valve 25 is depressurized in the heat-source-side expansion valve 25 to a low-pressure gas-liquid two-phase state and sent to the heat-source-side heat exchanger 24 through the heat-source-side liquid refrigerant tube 24a. The low-pressure refrigerant sent to the heat-source-side heat exchanger 24 undergoes heat exchange in the heat-source-side heat exchanger 24 with the outdoor air fed by the heat-source-side fan 32, and the refrigerant evaporates. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the aqueous medium circuit 80a, the aqueous medium circulated through the aqueous medium circuit 80a is heated by the heat radiation of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a undergoes heat exchange in the heat exchange coil 82a with the aqueous medium in the hot-water storage tank 81a, heat is radiated, and the aqueous medium in the hot-water storage tank 81a is thereby heated. The aqueous medium sent to the hot-water air-warming unit 9a radiates heat in the heat exchange panel 91a, the walls and other indoor areas are thereby heated, and the indoor floor is heated.

The operation in the hot-water supply/air-warming operation for performing the hot-water supply operation of the first usage unit 4a as well as the air-warming operation of the second usage unit 10a and/or the second usage unit 10b are thus performed.

Thus, in this heat pump system 1, the hot-water supply operation and the air-warming operation cannot be performed while the thermoregulation mode is left switched to the heat-source-side radiating operation state, and the air-cooling operation cannot be performed while the thermoregulation mode is left switched to the heat-source-side evaporating operation state. Specifically, in order to perform the desired operations in the first usage unit 4a and the second usage units 10a, 10b, not only must there be a hot-water supply operation command from the first usage-side controller 77a to the first usage unit 4a and an air-cooling operation or air-warming operation command from the second usage-side controllers 108a, 108b to the second usage units 10a, 10b, but there must also be a switch in the thermoregulation mode, which is the switched state of the heat-source-side switching mechanism 23 which determines the operation state in the heat source unit 2 shared by the first and second usage units 4a, 10a, 10b, which means that in this heat pump system 1, the first usage unit 4a and the second usage units 10a, 10b are incapable of individually selecting and operating the hot-water supply operation, the air-cooling operation, or the air-warming operation.

—Thermoregulation Mode Switching Control—

However, since users simply recognize this heat pump system 1 as being both an air-cooling and air-warming apparatus due to the second usage units 10a, 10b and a hot water supply apparatus due to the first usage unit 4a and other components, users fail to recognize the necessity of switching the thermoregulation mode and forget to switch the thermoregulation mode, switching mistakes may occur, and switching the thermoregulation mode is complicated.

In view of this, in this heat pump system 1, thermoregulation mode switching control is performed, whereby operation is switched to a thermoregulation mode different from the switched state of the heat-source-side switching mechanism 23 as the thermoregulation mode commanded by one of the second usage-side controllers 108a, 108b (the second usage-side controller 108a in this case) which issue commands to the second usage units 10a, 10b.

Figure 2:
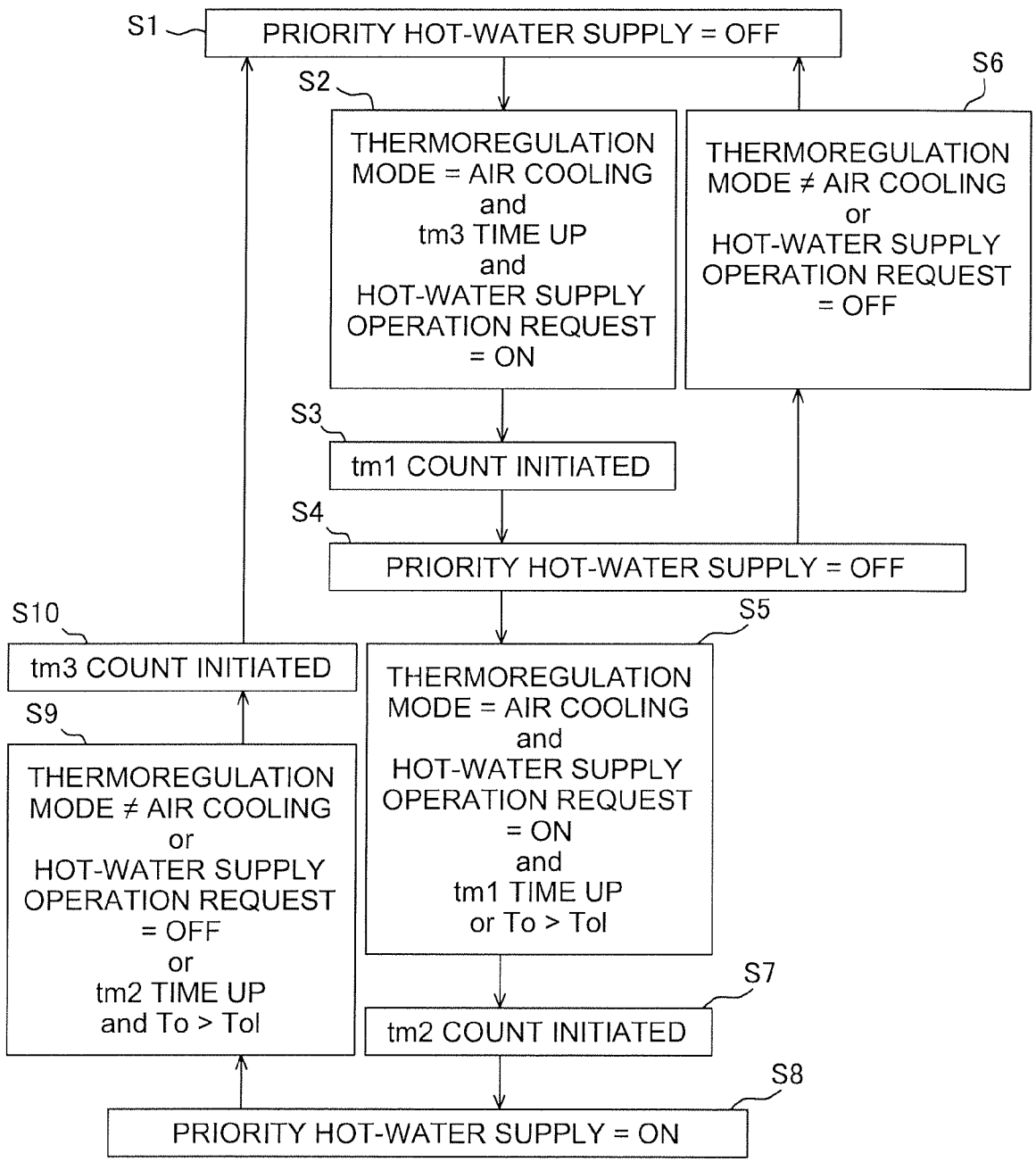
FIG. 2 is a control logic block diagram of thermoregulation mode switching control in the first embodiment and second embodiment.

Hereinbelow, FIG. 2 is used to describe a control logic block diagram of the thermoregulation mode switching control in this heat pump system 1. In this thermoregulation mode switching control, when a hot-water supply operation command is issued from the first usage-side controller 77a to the first usage unit 4a (consequently, when the thermoregulation mode must be the heat-source-side evaporating operation state) while the thermoregulation mode is in the heat-source-side radiating operation state (i.e., the second usage units 10a, 10b are performing the air-cooling operation, or if they are not performing the air-cooling operation, the second usage-side controller 108a issues a command that the thermoregulation mode be the heat-source-side radiating operation state), the thermoregulation mode is switched to the heat-source-side evaporating operation state and a priority hot-water supply operation (steps S7 to S9) is performed, which is an operation in which the hot-water supply operation of the first usage unit 4a is performed; otherwise the operation (steps S1, S4) in the commanded thermoregulation mode (the thermoregulation mode commanded by the second usage-side controller 108a in this case) is performed.

First, the operation state of step S1 is continued, i.e., the operation in the thermoregulation mode commanded by the second usage-side controller 108a (in FIG. 2, this operation is "priority hot-water supply operation=OFF") is continued.

Next, in step S2, a determination is made of whether or not a condition A is satisfied. Condition A is that the thermoregulation mode commanded by the second usage-side controller 108a be the heat-source-side radiating operation state (in FIG. 2, this state is "thermoregulation mode"=air cooling), that a predetermined third time duration tm3 has elapsed (in FIG. 2, this state is "tm3 time up"), and whether or not a command for the hot-water supply operation has been issued by the first usage-side controller 77a to the first usage unit 4a (in FIG. 2, this command-issued state is "hot-water supply operation request=ON"); thereby determining whether or not a command for the hot-water supply operation has been issued to the first usage unit 4a while the thermoregulation mode is in the heat-source-side radiating operation state. The time duration tm3 is a time duration set in step S10 described hereinafter. When it has been determined in step S2 that condition A is not satisfied, i.e., either when the thermoregulation mode is in the heat-source-side evaporating operation state (in FIG. 2, this state is "thermoregulation mode≠air cooling"), when the third time duration tm3 has not elapsed, or when a command for the hot-water supply operation has not been issued by the first usage-side controller 77a to the first usage unit 4a (i.e. "hot-water supply operation request=OFF"), the operation in the thermoregulation mode commanded by the second usage-side controller 108a (i.e., "priority hot-water supply operation=OFF") is continued. When it is determined that condition A is satisfied, since a hot-water supply operation command has been issued regardless of the thermoregulation mode being in the heat-source-side radiating operation state, i.e., since the aqueous medium cannot be heated even if the operation of the first usage unit 4a is initiated according to the hot-water supply operation command from the first usage-side controller 77a, the process transitions to step S3 and onward, preparing for the priority hot-water supply operation (steps S7 to S9).

Next, in steps S3 and S4, when condition A is satisfied, instead of transitioning immediately to the priority hot-water supply operation (steps S7 to S9), the count of a predetermined first time duration tm1 is initiated in step S3, and the operation in the thermoregulation mode commanded by the second usage-side controller 108a (i.e. "priority hot-water supply operation=OFF") is continued similar to step S1. The first time duration tm1 is equivalent to a time interval from the end of the process of step S2 until the start of the processes of steps S5 and S6, and is set somewhere between several and ten minutes.

Next, in step S5, a determination is made of whether or not a condition B is satisfied. Condition B is that the thermoregulation mode commanded by the second usage-side controller 108a is in the heat-source-side radiating operation state (i.e. "thermoregulation mode=air cooling"), whether or not a hot-water supply operation command has been issued by the first usage-side controller 77a to the first usage unit 4a (i.e. "hot-water supply operation request=ON"), and either whether or not the first time duration tm1 has elapsed (in FIG. 2, this state is "tm1 time up") or whether or not the outside air temperature To is lower than a predetermined low-temperature condition temperature Tot (in FIG. 2, this state is "To<To1"), thereby determining if condition A has continued to be satisfied for the first time duration tm1 and the hot-water supply operation request is reliable in step S2, or if the thermoregulation mode commanded by the second usage-side controller 108a is in the heat-source-side radiating operation state (i.e. "thermoregulation mode=air cooling") regardless of the outside air temperature To being in low-temperature conditions. The low-temperature condition temperature To1 is equivalent to the highest temperature at which the air-warming operation of the second usage units 10a, 10b is assumed to be performed, and is set to about 15° C. When it has been determined in step S5 that condition B is not satisfied, i.e., when either the thermoregulation mode is in the heat-source-side evaporating operation state (i.e. "thermoregulation mode≠air cooling") or a hot-water supply operation command has not been issued by the first usage-side controller 77a to the first usage unit 4a (i.e. "hot-water supply operation request=OFF"), a condition D of step S6 is determined to be satisfied and the operation in the thermoregulation mode commanded by the second usage-side controller 108a of step S1 (i.e. "priority hot-water supply operation=OFF") is continued, and when condition B is determined to be satisfied, either the hot-water supply operation request is reliable or the thermoregulation mode commanded by the second usage-side controller 108a is in the heat-source-side radiating operation state (i.e. "thermoregulation mode=air cooling") regardless of the outside air temperature To being in low-temperature conditions, and the process therefore transitions to the priority hot-water supply operation (steps S7 to S9).

Next, in steps S7 to S9, first a count of a predetermined second time duration tm2 is initiated in step S7. The second time duration tm2 is equivalent to the time duration in which the priority hot-water supply operation is performed, and is set somewhere between 10 and 30 minutes. In step S8, regardless of the second usage-side controller 108a having issued a command that the thermoregulation mode be in the heat-source-side radiating operation state (i.e. "thermoregulation mode=air cooling"), the thermoregulation mode is switched to the heat-source-side evaporating operation state, and the circulation pump 43a is started up, the first usage-side flow rate adjustment valve 42a opened, and other operations performed to initiate the hot-water supply operation of the first usage unit 4a (i.e. the priority hot-water supply operation).

To perform this manner of priority hot-water supply operation, when the thermoregulation mode is switched from the heat-source-side radiating operation state to the heat-source-side evaporating operation state, the second usage units 10a, 10b are switched to a state of performing the air-warming operation, and when the second usage units 10a, 10b have been performing the air-cooling operation until the priority hot-water supply operation is initiated, the second usage units 10a, 10b go into a state of performing the air-warming operation, and the air-warming operation is initiated when an air-cooling operation command is issued from the second usage-side controllers 108a, 108b to the second usage units 10a, 10b during the priority hot-water supply operation, which compromises the level of comfort in the room and is therefore undesirable. In view of this, in this heat pump system 1, the air-cooling operation of the second usage units 10a, 10b is prohibited during the priority hot-water supply operation.

When the air-cooling operation of the second usage units 10a, 10b is prohibited during the priority hot-water supply operation as described above and the operation of the usage-side fans 105a, 105b is stopped in the second usage units 10a, 10b which have been issued commands for the air-cooling operation from the second usage-side controllers 108a, 108b, there is a risk of the user misinterpreting that a malfunction has occurred in the second usage units 10a, 10b. In view of this, in this heat pump system 1, the usage-side fans 105a, 105b are operated in a state in which the second usage-side flow rate adjustment valves 102a, 102b have been closed to stop the air-cooling operation during the priority hot-water supply operation in the second usage units 10a, 10b which have been issued commands for the air-cooling operation from the second usage-side controllers 108a, 108b. The operating frequencies of the usage-side fans 105a, 105b are preferable the minimum frequency here in order to prevent drafts in the room.

Furthermore, when the operation state displays of the second usage units 10a, 10b are changed in the second usage-side controllers 108a, 108b (i.e., the air-cooling operation is changed to stop) in conjunction with the stopping of the air-cooling operation of the second usage units 10a, 10b during the priority hot-water supply operation as described above, there is a risk of the user misinterpreting that a malfunction has occurred in the second usage units 10a, 10b. In view of this, in this heat pump system 1, the second usage-side controllers 108a, 108b continue the display stating that the air-cooling operation is in effect even when the air-cooling operation of the second usage units 10a, 10b is stopped during the priority hot-water supply operation.

The priority hot-water supply operation is then continued until a condition C is satisfied in step S9. Condition C is that either a command that the thermoregulation mode be switched to the heat-source-side evaporating operation state has been issued by the second usage-side controller 108a (i.e. "thermoregulation mode≠air cooling"), a command that the hot-water supply operation be stopped has been issued by the first usage-side controller 77a to the first usage unit 4a (i.e. "hot-water supply operation request=OFF"), or the second time duration tm2 has elapsed (in FIG. 2 this state is "tm2 time up") in a state in which the outside air temperature To is higher than a predetermined high-temperature condition temperature Toh (in FIG. 2 this state is "To>Toh"); whereby it is determined in step S9 that either it is possible to perform the hot-water supply operation without performing the priority hot-water supply operation, the hot-water supply operation is not necessary, or the priority hot-water supply operation has continued for the second time duration tm2. The high-temperature condition temperature Toh is equivalent to the lowest temperature at which the air-cooling operation of the second usage units 10a, 10b is assumed to be performed, and is set to about 20° C. The priority hot-water supply operation is then continued until condition C is determined to be satisfied in step S9, i.e., until either it becomes possible to perform the hot-water supply operation without performing the priority hot-water supply operation, the hot-water supply operation becomes unnecessary, or the priority hot-water supply operation has continued for the second time duration tm2; after which the process transitions (steps S10, S1) to resuming the operation in the thermoregulation mode commanded by the second usage-side controller 108a.

Next, in steps S10 and S1, first a count of the predetermined third time duration tm3 is initiated in step S10, and then a process is performed in step S1 of resuming the operation in the thermoregulation mode commanded by the second usage-side controller 108a. The third time duration tm3 is equivalent to the time duration during which the operation is performed in the thermoregulation mode commanded by the second usage-side controller 108a without performing the priority hot-water supply operation when the priority hot-water supply operation has been requested, and the third time duration tm3 is set somewhere between 5 and 25 minutes. When the hot-water supply operation of the first usage unit 4a has been requested during the air-cooling operation of the second usage units 10a, 10b, for example, the priority hot-water supply operation is performed for the second time duration tm2 and the air-cooling operation is performed for the third time duration tm3.

Due to the thermoregulation mode switching control described above, in this heat pump system 1, when either the operation of the second usage units 10a, 10b has been stopped or the air-cooling operation is being performed (i.e. when the thermoregulation mode commanded by the second usage-side controller 108a is the heat-source-side radiating operation state), and also when the hot-water supply operation has been requested of the second usage unit 10a (i.e. a hot-water supply operation command has been issued from the first usage-side controller 77a to the first usage unit 4a), the thermoregulation mode can be switched to the heat-source-side evaporating operation state and the priority hot-water supply operation can be performed regardless of the second usage-side controller 108a commanding that the thermoregulation mode be the heat-source-side radiating operation state, i.e., the operation can be switched to a thermoregulation mode different from the switched state of the heat-source-side switching mechanism 23 as the thermoregulation mode commanded by the second usage-side controller 108a.

<Characteristics>

The heat pump system 1 has the following characteristics.

—A—

In the heat pump system 1, it is possible to switch operation to a thermoregulation mode different from the switched state of the heat-source-side switching mechanism 23 as the thermoregulation mode commanded by the second usage-side controllers 108a, 108b (the second usage-side controller 108a in this case) which issue commands to the second usage units 10a, 10b, such as in the thermoregulation mode switching control described above, and when the hot-water supply operation is performed with the thermoregulation mode having been switched to the heat-source-side radiating operation state, for example, it is possible to switch to a thermoregulation mode suitable for the desired operation without the user performing an operation (command) of switching the thermoregulation mode, as though the thermoregulation mode had been switched to the heat-source-side evaporating operation state.

—B—

In the heat pump system 1, thermoregulation mode switching can be performed appropriately because switching of the thermoregulation mode is performed based at least one of the commanded thermoregulation mode (in this case, the switched state of the heat-source-side switching mechanism 23 as the thermoregulation mode commanded by the second usage-side controller 108a) and the outside air temperature To, as in steps S2, S5, S6, and S9 in the thermoregulation mode switching control described above.

Also in the heat pump system 1, hunting does not occur readily in the thermoregulation mode because a determination is made of whether or not the thermoregulation mode must be switched in two stages (in this case, whether or not the priority hot-water supply operation must be performed), as in steps S1 through S6 in the thermoregulation mode switching control described above.

—C—

In the heat pump system 1, when a hot-water supply operation command is issued from the first usage-side controller 77a to the first usage unit 4a while the thermoregulation mode is in the heat-source-side radiating operation state, the hot-water supply operation of the first usage unit 4a (i.e. the priority hot-water supply operation) can be performed by switching the thermoregulation mode from the heat-source-side radiating operation state to the heat-source-side evaporating operation state, and it is therefore possible to perform the hot-water supply operation as necessary without the user performing an operation (command) of switching the thermoregulation mode to the heat-source-side evaporating operation state, even in operating conditions such as summer when the air-cooling operation is needed.

—D—

In the heat pump system 1, since the air-cooling operation of the second usage units 10a, 10b is prohibited when the priority hot-water supply operation is performed, the second usage units 10a, 10b which had been performing the air-cooling operation transition to performing the air-warming operation due to the thermoregulation mode for performing the priority hot-water supply operation being switched from the radiating operation state to the evaporating operation state, and the air-warming operation is no longer initiated when an air-cooling operation command is issued from the second usage-side controllers 108a, 108b to the second usage units 10a, 10b during the priority hot-water supply operation, whereby the compromising of the level of comfort in the room can be prevented when the priority hot-water supply operation is performed.

In the heat pump system 1, since the usage-side fans 105a, 105b are operated while the air-cooling operation is stopped during the priority hot-water supply operation in the second usage units 10a, 10b which have been issued commands for the air-cooling operation from the second usage-side controllers 108a, 108b, the usage-side fans 105a, 105b of the second usage units 10a, 10b during the air-cooling operation are not stopped from operating when the air-cooling operation of the second usage units 10a, 10b is prohibited, whereby it is possible to ensure that the user does not misinterpret that a malfunction has occurred in the second usage units 10a, 10b due to the priority hot-water supply operation being performed.

Furthermore, in the heat pump system 1, since the second usage-side controllers 108a, 108b continue the display stating that the air-cooling operation is in effect even when the air-cooling operation of the second usage units 10a, 10b has been stopped during the priority hot-water supply operation, the display of the operation state of the second usage units in the second usage-side controllers 108a, 108b is not changed in conjunction with the stopping of the air-cooling operation of the second usage units 10a, 10b during the priority hot-water supply operation, whereby it is possible to ensure that the user does not misinterpret that a malfunction has occurred in the second usage units 10a, 10b due to the priority hot-water supply operation being performed.

Second Embodiment

In the heat pump system 1 in the first embodiment described above, operation must be carried out under conditions in which the pressure of the heat-source-side refrigerant in the discharge of the heat-source-side compressor 21 is increased, or under other poor conditions in order to obtain a high-temperature aqueous medium such as hot water at, e.g., 65° C. or higher, and such an operation is not regarded as a preferred operation.

Figure 3:
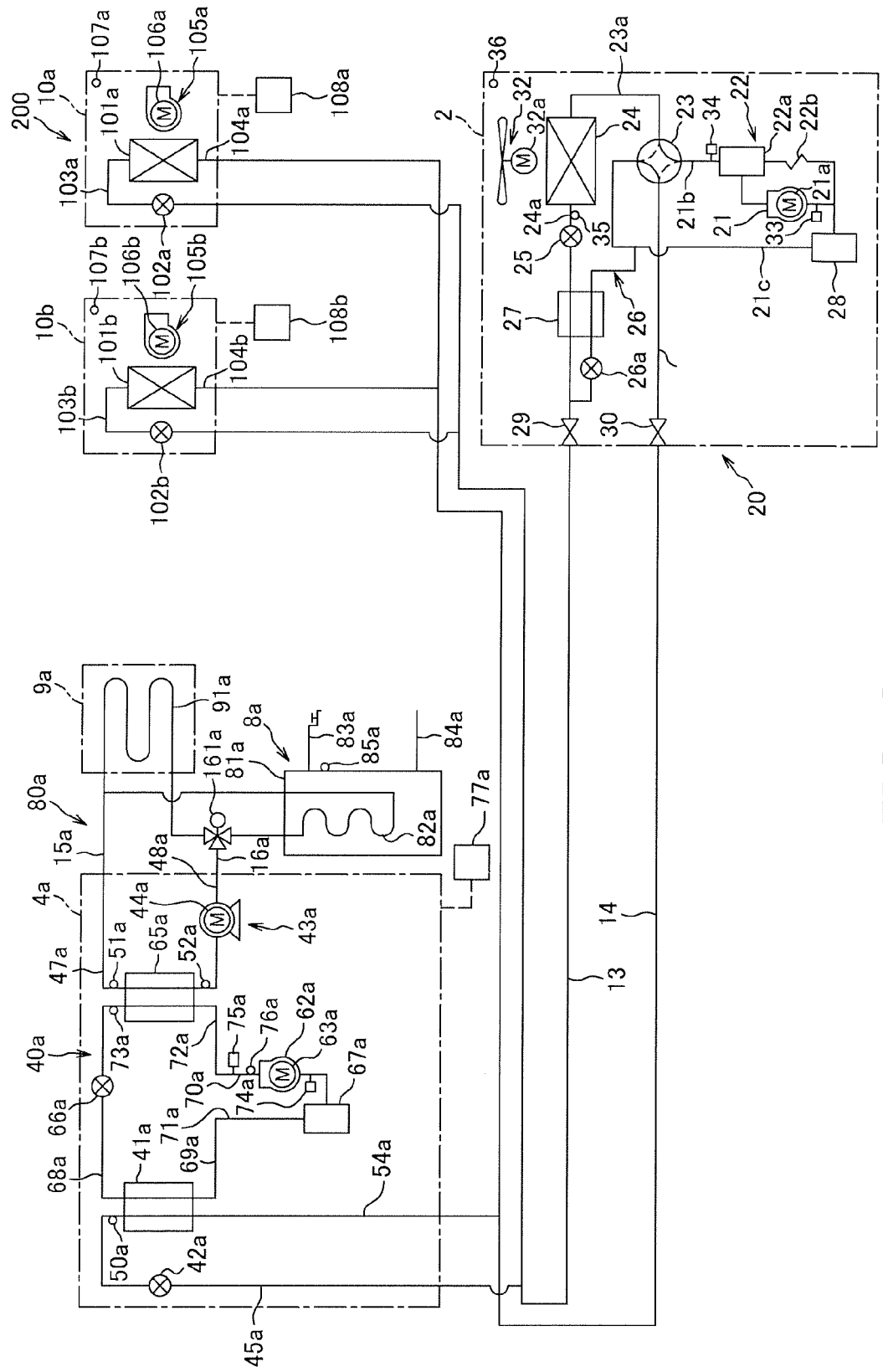
FIG. 3 is a schematic structural diagram of the heat pump system according to the second embodiment of the present invention.

In view of the above, with the heat pump system 200, the first usage-side heat exchanger 41a in the configuration of the heat pump system 1 in the first embodiment described above (see FIG. 1) is a heat exchanger for exchanging heat between the heat-source-side refrigerant introduced from the gas refrigerant communication tube 14 and the usage-side refrigerant, which is separate from the heat-source-side refrigerant; and the first usage unit 4a is further provided with a usage-side compressor 62a (described hereinafter) for compressing the usage-side refrigerant, and/or a refrigerant/water heat exchanger 65a (described hereinafter) that can function as a radiator of the usage-side refrigerant and heat the aqueous medium, which together with the first usage-side heat exchanger 41a thereby constitutes the usage-side refrigerant circuit 40a through which the usage-side refrigerant circulates, as shown in FIG. 3. The configuration of the heat pump system 200 is described below.

<Configuration>

—Overall Configuration—

FIG. 3 is a schematic structural diagram of the heat pump system 200 according to the second embodiment of the present invention. The heat pump system 200 is an apparatus capable of performing an operation for heating an aqueous medium, and other operation using a vapor compression heat pump cycle.

The heat pump system 200 comprises primarily a heat source unit 2, a first usage unit 4a, second usage units 10a, 10b, a liquid-refrigerant communication tube 13, a gas-refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage units 10a, 10b are connected via the refrigerant communication tubes 13, 14 to thereby constitute a heat-source-side refrigerant circuit 20. The first usage unit 4a constitutes a usage-side refrigerant circuit 40a. The first usage unit 4a, the hot-water storage unit 8a, and the hot-water air-warming unit 9a are connected via the aqueous medium communication tubes 15a, 16a to thereby constitute an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility in relation to the HFC-based refrigerant is enclosed for lubrication of the heat-source-side compressor 21. HFC-134a, which is a type of HFC-based refrigerant, is enclosed inside the usage-side refrigerant circuit 40a as a usage-side refrigerant, and an ester-based or ether-based refrigeration machine oil having compatibility in relation to the HFC-based refrigerant is enclosed for lubrication of the usage-side compressor 62a. The usage-side refrigerant is preferably one in which the pressure that corresponds to a saturated gas temperature of 65° C. is a maximum gauge pressure of 2.8 MPa or less, and more preferably 2.0 MPa or less from the viewpoint of using a refrigerant that is advantageous for a high-temperature refrigeration cycle. HFC-134a is a type of refrigerant having such saturation pressure characteristics. Water as the aqueous medium circulates in the aqueous medium circuit 80a.

In the description related to the configurations below, the same reference numerals will be used and a description omitted for the configuration of the heat source unit 2, the second usage unit 10a, the hot-water storage unit 8a, the hot-water air-warming unit 9a, the liquid refrigerant communication tube 13, the gas-refrigerant communication tube 14, the aqueous medium communication tubes 15a, 16a, the first usage-side controller 77a, and the second usage-side controllers 108a, 108b, all of which have the same configuration as those of heat pump system 1 in the first embodiment (see FIG. 1). Only the configuration of the first usage unit 4a will be described.

—First Usage Unit—

The first usage unit 4a is disposed indoors and connected to the heat source unit 2 via the refrigerant communication tubes 13, 14, constituting a portion of the heat-source-side refrigerant circuit 20. The first usage unit 4a constitutes the usage-side refrigerant circuit 40a. Furthermore, the first usage unit 4a is connected to the hot-water storage unit 8a and the hot-water air-warming unit 9a via the aqueous medium communication tubes 15a, 16a, constituting a portion of aqueous medium circuit 80a.

The first usage unit 4a has primarily the first usage-side heat exchanger 41a, the first usage-side flow rate adjustment valve 42a, the usage-side compressor 62a, the refrigerant/water heat exchanger 65a, a refrigerant/water heat exchange-side flow rate adjustment valve 66a, a usage-side accumulator 67a, and a circulation pump 43a.

The first usage-side heat exchanger 41a is a heat exchanger that functions as a radiator of the heat-source-side refrigerant by performing heat exchange between the heat-source-side refrigerant and the usage-side refrigerant. A first usage-side liquid refrigerant tube 45a is connected to the liquid side of the channel through which the heat-source-side refrigerant flows. A first usage-side gas refrigerant tube 54a is connected to the gas side of the channel through which the heat-source-side refrigerant flows. A cascade-side liquid-refrigerant tube 68a is connected to the liquid side of the channel through which the usage-side refrigerant flows, and a second cascade-side gas-refrigerant tube 69a is connected to the gas side of the channel through which the usage-side refrigerant flows. The liquid refrigerant communication tube 13 is connected to the first usage-side liquid refrigerant tube 45a. The gas refrigerant communication tube 14 is connected to the first usage-side gas refrigerant tube 54a. The refrigerant/water heat exchanger 65a is connected to the cascade-side liquid-refrigerant tube 68a, and the usage-side compressor 62a is connected to the second cascade-side gas-refrigerant tube 69a.

The first usage-side flow rate adjustment valve 42a is an electrical expansion valve that can vary the flow rate of the heat-source-side refrigerant that flows through the first usage-side heat exchanger 41a by controlling the opening degree, and is provided to the first usage-side liquid refrigerant tube 45a.

The usage-side compressor 62a is a mechanism for compressing the usage-side refrigerant, and in this case, is a sealed compressor having rotary elements, scroll elements, or other type of positive displacement compression elements (not shown) accommodated in a casing (not shown), and is driven by a usage-side compression motor 63a accommodated in the same casing. A high-pressure space (not shown) which is filled with the usage-side refrigerant that has been compressed in the compression element is formed inside the casing of the usage-side compressor 62a, and refrigeration machine oil is accumulated in this high-pressure space. The rotational speed (i.e., operational frequency) of the usage-side compression motor 63a can be varied by using an inverter device (not shown), whereby the capacity of the usage-side compressor 62a can be controlled. A cascade-side discharge tube 70a is connected to the discharge of the usage-side compressor 62a, and a cascade-side intake tube 71a is connected to the intake of the usage-side compressor 62a. The cascade-side gas-refrigerant tube 71a is connected to the second cascade-side gas-refrigerant tube 69a.

The refrigerant/water heat exchanger 65a is a heat exchanger that functions as a radiator of the usage-side refrigerant by heat exchange between the usage-side refrigerant and the aqueous medium. A cascade-side liquid-refrigerant tube 68a is connected to the liquid side of the channel through which the usage-side refrigerant flows. A first cascade-side gas-refrigerant tube 72a is connected to the gas side of the channel through which the usage-side refrigerant flows. A first usage-side water inlet tube 47a is connected to the inlet side of the channel through which the aqueous medium flows. A first usage-side water outlet tube 48a is connected to the outlet side of the channel through which the aqueous medium flows. The first cascade-side gas-refrigerant tube 72a is connected to the cascade-side discharge tube 70a. An aqueous medium communication tube 15a is connected to the first usage-side water inlet tube 47a and an aqueous medium communication tube 16a is connected to the first usage-side water outlet tube 48a.

The refrigerant/water heat exchange-side flow rate adjustment valve 66a is an electrical expansion valve that can vary the flow rate of the usage-side refrigerant that flows through the refrigerant/water heat exchanger 65a by controlling the opening degree, and is provided to the cascade-side liquid-refrigerant tube 68a.

The usage-side accumulator 67a is a container provided to the cascade-side intake tube 71a and is used for temporarily accumulating the usage-side refrigerant circulating through the usage-side refrigerant circuit 40a before the usage-side refrigerant is taken from the cascade-side intake tube 71a into the usage-side compressor 62a.

In this manner, the usage-side compressor 62a, the refrigerant/water heat exchanger 65a, the refrigerant/water heat exchange-side flow rate adjustment valve 66a, and the first usage-side heat exchanger 41a are connected via the refrigerant tubes 71a, 70a, 72a, 68a, 69a to thereby constitute the usage-side refrigerant circuit 40a.

The circulation pump 43a is a mechanism for increasing the pressure of the aqueous medium, and in this configuration, is a pump in which a centrifugal and/or positive-displacement pump element (not shown) is driven by a circulation pump motor 44a. The circulation pump 43a is provided to the first usage-side water outlet tube 48a. The rotational speed (i.e., operational frequency) of the circulation pump motor 44a can be varied by using an inverter device (not shown), whereby the capacity of the circulation pump 43a can be controlled.

The first usage unit 4a can thereby perform hot-water supply operation by causing the first usage-side heat exchanger 41a to function as a radiator of the heat-source-side refrigerant introduced from the discharge refrigerant communication tube 12, whereby the heat-source-side refrigerant, which has released heat in the first usage-side heat exchanger 41a, is directed out to the liquid refrigerant communication tube 13, the usage-side refrigerant that circulates through the usage-side refrigerant circuit 40a is heated by the radiation of the heat-source-side refrigerant in the first usage-side heat exchanger 41a, the usage-side refrigerant thus heated is compressed in the usage-side compressor 62a, and the aqueous medium is thereafter heated by the radiation of the refrigerant/water heat exchanger 65a.

Various types of sensors are provided to the first usage unit 4a. Specifically provided to the first usage unit 4a are a first usage-side heat exchange temperature sensor 50a for detecting a first usage-side refrigerant temperature Tsc1, which is the temperature of the heat-source-side refrigerant in the liquid side of the first usage-side heat exchanger 41a; a first refrigerant/water heat exchange temperature sensor 73a for detecting a cascade-side refrigerant temperature Tsc2, which is the temperature of the usage-side refrigerant in the liquid side of the refrigerant/water heat exchanger 65a; an aqueous medium inlet temperature sensor 51a for detecting an aqueous medium inlet temperature Twr, which is the temperature of the aqueous medium in the inlet of the refrigerant/water heat exchanger 65a; an aqueous medium outlet temperature sensor 52a for detecting an aqueous medium outlet temperature Tw1, which is the temperature of the aqueous medium in the outlet of the refrigerant/water heat exchanger 65a; a usage-side intake pressure sensor 74a for detecting a usage-side intake pressure Ps2, which is the pressure of the usage-side refrigerant in the intake of the usage-side compressor 62a; a usage-side discharge pressure sensor 75a for detecting the usage-side discharge pressure Pd2, which is the pressure of the usage-side refrigerant in the discharge of the usage-side compressor 62a; and a usage-side discharge temperature sensor 76a for detecting the usage-side discharge temperature Td2, which is the temperature of the usage-side refrigerant in the discharge of the usage-side compressor 62a.

The heat pump system 200 is also provided with a control part (not shown) for performing the following operations and various controls by the settings and commands of the first and second usage-side controllers.

<Operation>

Next, the operation of the heat pump system 200 will be described.

The operations of the heat pump system 200 include, similar to the heat pump system 1 of the first embodiment, a hot-water supply operation for performing only the hot-water supply operation (i.e. operation of the hot-water storage unit 8a and/or the hot-water air-warming unit 9a) of the first usage unit 4a, an air-cooling operation for performing only the air-cooling operation of the second usage unit 10a and/or the second usage unit 10b, an air-warming operation for performing only the air-warming operation of the second usage unit 10a and/or the second usage unit 10b, and a hot-water supply/air-warming operation for performing the hot-water supply operation of the first usage unit 4a as well as the air-warming operation of the second usage unit 10a and/or the second usage unit 10b.

The operations in the four operations of the heat pump system 200 are described hereinbelow.

—Hot-Water Supply Operation—

In the case of performing only the hot-water supply operation of the first usage unit 4a, the heat-source-side switching mechanism 23 is switched to the heat-source-side evaporating operation state (indicated by dashed lines in the heat-source-side switching mechanism 23 in FIG. 3), and the intake return expansion valve 26a and the second usage-side flow rate adjustment valves 102a, 102b are closed in the heat-source-side refrigerant circuit 20. In the aqueous medium circuit 80a, the aqueous-medium-side switching mechanism 161a is switched to the state of feeding the aqueous medium to the hot-water storage unit 8a and/or the hot-water air-warming unit 9a. The switched state of the heat-source-side switching mechanism 23 as the thermoregulation mode is switched here to the heat-source-side evaporating operation state by one of the second usage-side controllers 108a, 108b, while an operation (hot-water supply operation) of the first usage unit 4a (and the hot-water storage unit 8a and/or the hot-water air-warming unit 9a) is performed by an operation command of the first usage-side controller 77a.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration oil is separated from the high-pressure heat-source-side refrigerant discharged to the heat-source-side discharge tube 21b. The refrigeration oil separated from the heat-source-side refrigerant in the oil separator 22a is returned to the heat-source-side intake tube 21c through the oil return tube 22b. The high-pressure heat-source-side refrigerant from which the refrigeration oil has been separated is sent from the heat source unit 2 to the gas refrigerant communication tube 14 through the heat-source-side switching mechanism 23, the second heat-source-side gas refrigerant tube 23b, and the gas-side shutoff valve 30.

The high-pressure heat-source-side refrigerant sent to the gas refrigerant communication tube 14 is sent to the first usage unit 4a. The high-pressure heat-source-side refrigerant sent to the first usage unit 4a is sent to the first usage-side heat exchanger 41a through the first usage-side gas refrigerant tube 54a. Having been sent to the first usage-side heat exchanger 41a, the high-pressure heat-source-side refrigerant undergoes heat exchange in the first usage-side heat exchanger 41a with the usage-side refrigerant at a low pressure in the refrigeration cycle circulating in the usage-side refrigerant circuit 40a, and the heat-source-side refrigerant radiates heat. Having radiated heat in the first usage-side heat exchanger 41a, the high-pressure heat-source-side refrigerant is sent from the first usage unit 4a to the liquid refrigerant communication tube 13 through the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 via a liquid-side shutoff valve 29. The heat-source-side refrigerant sent to the subcooler 27 does not undergo heat exchange and is sent to the heat-source-side expansion valve 25 because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of a heat-source-side liquid-refrigerant tube 24a. The low-pressure refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 via the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 via the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a via the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a via the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulated through the aqueous medium circuit 80a is heated by the heat radiation of the usage-side refrigerant in the refrigerant-water heat exchanger 65a. The aqueous medium heated in the refrigerant-water heat exchanger 65a is drawn into the circulation pump 43a through the first usage-side water outlet tube 48a and pressurized, and subsequently sent from the first usage unit 4a to the aqueous medium communication tube 16a. The aqueous medium sent to the hot-water storage unit 8a undergoes heat exchange in the heat exchange coil 82a with the aqueous medium in the hot water storage tank 81a and radiates heat, whereby the aqueous medium in the hot-water storage tank 81a is heated. The aqueous medium sent to the hot-water air-warming unit 9a radiates heat in the heat exchange panel 91a, the walls and other indoor areas are thereby heated, and the indoor floor is heated.

The operations in the hot-water supply operation for performing only the hot-water supply operation of the first usage unit 4a is thus performed.

—Air-Cooling Operation—

In the case of performing only the air-cooling operation of the second usage unit 10a and/or the second usage unit 10b, the heat-source-side switching mechanism 23 is switched to the heat-source-side radiating operation state (indicated by solid lines in the heat-source-side switching mechanism 23 in FIG. 3), and the first usage-side flow rate adjustment valve 42a is closed in the heat-source-side refrigerant circuit 20. The switched state of the heat-source-side switching mechanism 23 as the thermoregulation mode is switched to the heat-source-side radiating operation state by one of the second usage-side controllers 108a, 108b, and an operation (the air-cooling operation) of the second usage unit 10a and/or the second usage unit 10b is performed by an operation command of the second usage-side controller 108a and/or the second usage-side controller 108b. The air-cooling operation is not described herein because it is identical to the air-cooling operation in the heat pump system 1 of the first embodiment.

—Air-Warming Operation—

In the case of performing only the air-warming operation of the second usage unit 10a and/or the second usage unit 10b, the heat-source-side switching mechanism 23 is switched to the heat-source-side radiating operation state (indicated by dashed lines in the heat-source-side switching mechanism 23 in FIG. 3), and the intake return expansion valve 26a and the first usage-side flow rate adjustment valve 42a are closed in the heat-source-side refrigerant circuit 20. The switched state of the heat-source-side switching mechanism 23 as the thermoregulation mode is switched to the heat-source-side evaporating operation state by one of the second usage-side controllers 108a, 108b, and an operation (the air-warming operation) of the second usage unit 10a and/or the second usage unit 10b is performed by an operation command of the second usage-side controller 108a and/or the second usage-side controller 108b. The air-warming operation is not described herein because it is identical to the air-warming operation in the heat pump system 1 of the first embodiment.

—Hot-Water Supply/Air-Warming Operation—

In the case of performing the hot-water supply operation of the first usage unit 4a as well as the air-warming operation of the second usage unit 10a and/or the second usage unit 10b, the heat-source-side switching mechanism 23 is switched to the heat-source-side evaporating operation state (indicated by dashed lines in the heat-source-side switching mechanism 23 in FIG. 3), and the intake return expansion valve 26a is closed in the heat-source-side refrigerant circuit 20. In the aqueous medium circuit 80a, the aqueous-medium-side switching mechanism 161a is switched to a state in which the aqueous medium is fed to the hot-water storage unit 8a and/or the hot-water air-warming unit 9a. The switched state of the heat-source-side switching mechanism 23 as the thermoregulation mode is switched to the heat-source-side evaporating operation state by one of the second usage-side controllers 108a, 108b, an operation (the hot-water supply operation) of the first usage unit 4a (and the hot-water storage unit 8a and/or the hot-water air-warming unit 9a) is performed by an operation command of the first usage-side controller 77a, and an operation (the air-warming operation) of the second usage unit 10a and/or the second usage unit 10b is performed by an operation command of the second usage-side controller 108a and/or the second usage-side controller 108b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration oil is separated from the high-pressure heat-source-side refrigerant discharged to the heat-source-side discharge tube 21b. The refrigeration oil separated from the heat-source-side refrigerant in the oil separator 22a is returned to the heat-source-side intake tube 21c through the oil return tube 22b. The high-pressure heat-source-side refrigerant from which the refrigeration oil has been separated is sent from the heat source unit 2 to the gas refrigerant communication tube 14 through the heat-source-side switching mechanism 23, the second heat-source-side gas refrigerant tube 23b, and the gas-side shutoff valve 30.

The high-pressure heat-source-side refrigerant sent to the gas refrigerant communication tube 14 is sent to the first usage unit 4a and the second usage units 10a, 10b (in this description, both of the second usage units 10a, 10b are performing the air-warming operation).

The high-pressure heat-source-side refrigerant sent to the second usage units 10a, 10b is sent to the second usage-side heat exchangers 101a, 101b through the second usage-side gas refrigerant tubes 104a, 104b. The high-pressure heat-source-side refrigerant sent to the second usage-side heat exchangers 101a, 101b undergoes heat exchange in the second usage-side heat exchangers 101a, 101b with the air medium fed by the usage-side fans 105a, 105b and the refrigerant radiates heat, whereby indoor air warming is performed. Having radiated heat in the second usage-side, heat exchangers 101a, 101b, the high-pressure heat-source-side refrigerant is sent from the second usage units 10a, 10b to the liquid refrigerant communication tube 13 through the second usage-side flow rate adjustment valves 102a, 102b and the second usage-side liquid refrigerant tubes 103a, 103b.

The high-pressure heat-source-side refrigerant sent to the first usage unit 4a is sent to the first usage-side heat exchanger 41a through the first usage-side gas refrigerant tube 54a. The high-pressure heat-source-side refrigerant sent to the first usage-side heat exchanger 41a undergoes heat exchange in the first usage-side heat exchanger 41a with the usage-side refrigerant at a low pressure in the refrigeration cycle circulating through the usage-side refrigerant circuit 40a, and the heat-source-side refrigerant radiates heat. Having radiated heat in the first usage-side heat exchanger 41a, the high-pressure heat-source-side refrigerant is sent from the first usage unit 4a to the liquid refrigerant communication tube 13 through the first usage-side flow rate adjustment valve 42a and the first usage-side liquid refrigerant tube 45a.

The heat-source-side refrigerant sent from the second usage units 10a, 10b and the first usage unit 4a to the liquid refrigerant communication tube 13 is merged in the liquid refrigerant communication tube 13 and sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without undergoing heat exchange. The heat-source-side refrigerant sent to the heat-source-side expansion valve 25 is depressurized in the heat-source-side expansion valve 25 to a low-pressure gas-liquid two-phase state and sent to the heat-source-side heat exchanger 24 through the heat-source-side liquid refrigerant tube 24a. The low-pressure refrigerant sent to the heat-source-side heat exchanger 24 undergoes heat exchange in the heat-source-side heat exchanger 24 with the outdoor air fed by the heat-source-side fan 32, and the refrigerant evaporates. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating in the aqueous medium circuit 80a is heated by the heat radiation of the usage-side refrigerant in the refrigerant-water heat exchanger 65a. The aqueous medium heated in the refrigerant-water heat exchanger 65a is drawn into the circulation pump 43a through the first usage-side water outlet tube 48a and pressurized, and subsequently sent from the first usage unit 4a to the aqueous medium communication tube 16a. The aqueous medium sent to the hot-water storage unit 8a undergoes heat exchange in the heat exchange coil 82a with the aqueous medium in the hot water storage tank 81a and radiates heat, whereby the aqueous medium in the hot-water storage tank 81a is heated. The aqueous medium sent to the hot-water air-warming unit 9a radiates heat in the heat exchange panel 91a, the walls and other indoor areas are thereby heated, and the indoor floor is heated.

The operation is thus performed in the hot-water supply/air-warming operation for performing the hot-water supply operation of the first usage unit 4a as well as the air-warming operation of the second usage unit 10a and/or the second usage unit 10b.

Thus, in the heat pump system 200, similar to the heat pump system 1 of the first embodiment, the hot-water supply operation and the air-warming operation cannot be performed while the thermoregulation mode is left switched to the heat-source-side radiating operation state, and the air-cooling operation cannot be performed while the thermoregulation mode is left switched to the heat-source-side evaporating operation state. Specifically, in order to perform the desired operations in the first usage unit 4a and the second usage units 10a, 10b, not only must there be a hot-water supply operation command from the first usage-side controller 77a to the first usage unit 4a and an air-cooling operation or air-warming operation command from the second usage-side controllers 108a, 108b to the second usage units 10a, 10b, but there must also be a switch in the thermoregulation mode, which is the switched state of the heat-source-side switching mechanism 23 which determines the operation state in the heat source unit 2 shared by the first and second usage units 4a, 10a, 10b, which means that in this heat pump system 200, the first usage unit 4a and the second usage units 10a, 10b are incapable of individually selecting and operating the hot-water supply operation, the air-cooling operation, or the air-warming operation.

In this heat pump system 200 as well, similar to the heat pump system 1 of the first embodiment, thermoregulation mode switching control is performed, whereby operation can be switched to a thermoregulation mode different from the switched state of the heat-source-side switching mechanism 23 as the thermoregulation mode commanded by one of the second usage-side controllers 108a, 108b (the second usage-side controller 108a in this case) which issue commands to the second usage units 10a, 10b. The thermoregulation mode switching control is not described herein because it is identical to the thermoregulation mode switching control in the heat pump system 1 of the first embodiment (see FIG. 2 and others).

It is thereby possible in this heat pump system 200 as well to achieve the same operational effects as the heat pump system 1 of the first embodiment.

Third Embodiment

In the heat pump system 1 in the first embodiment described above (see FIG. 1), since the air-cooling operation of the second usage units 10a, 10b cannot be performed together with the hot-water supply operation of the first usage unit 4a, if it were possible to perform such an operation (hereinbelow referred to as the "exhaust heat hot-water supply operation"), it would also be possible to perform a hot-water supply operation according to the heat radiation load (i.e. the hot-water supply load) in the first usage-side heat exchanger 4a that is proportionate to the evaporation load (i.e. the air-cooling load) in the second usage-side heat exchangers 101a, 101b in an operation state such as summer when the air-cooling operation is performed, which would be preferable in terms of conserving energy.

Figure 4:
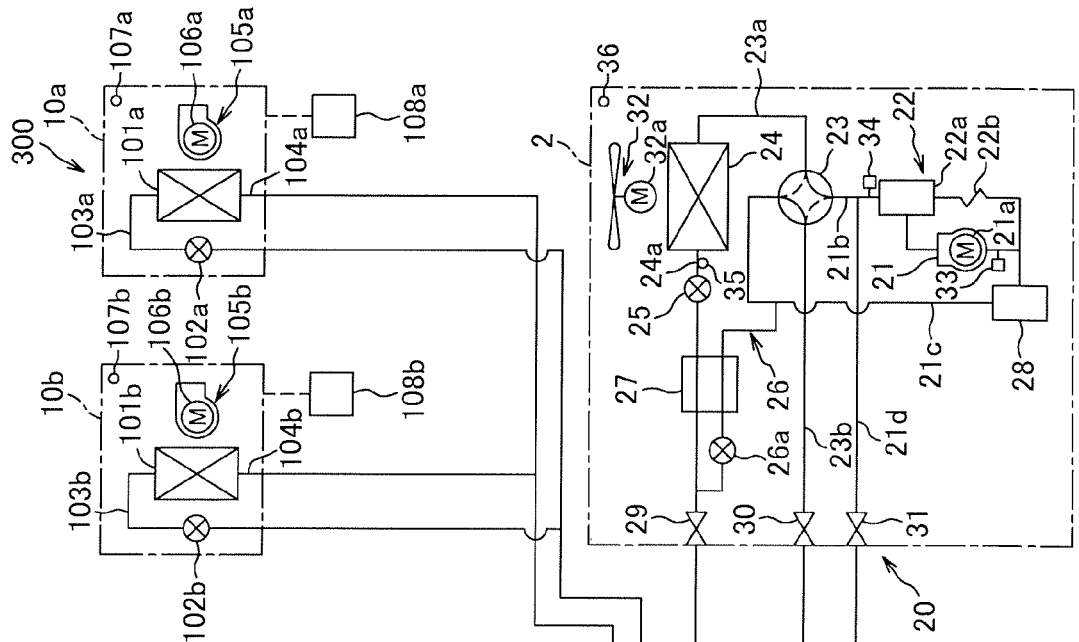
FIG. 4 is a schematic structural diagram of the heat pump system according to the third embodiment of the present invention.
Figure 4:
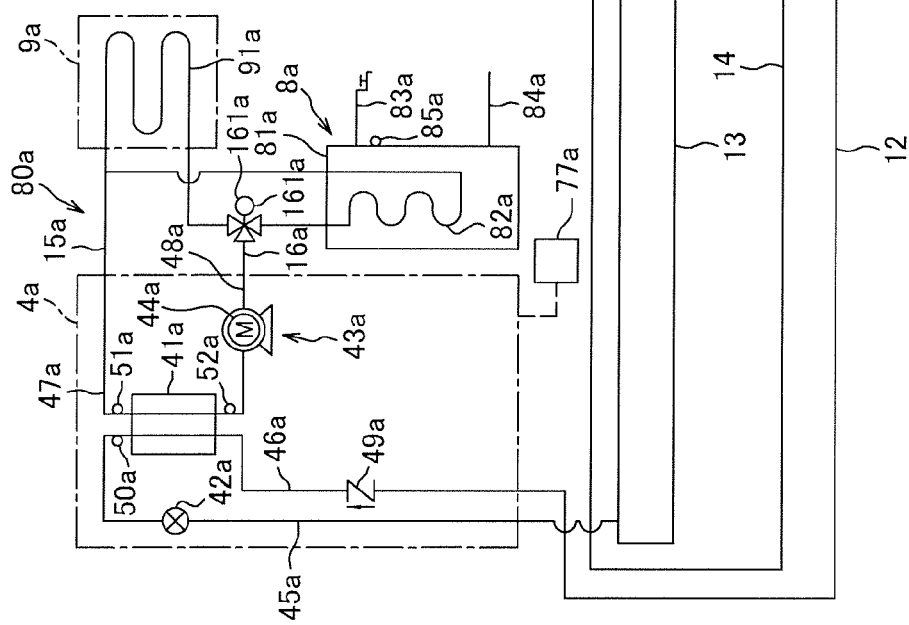

In view of this, the heat pump system 300 has the configuration of the heat pump system 1 according to the first embodiment described above (see FIG. 1), wherein an exhaust heat hot-water supply operation can be performed, which is an operation of cooling the air medium by making the second usage-side heat exchangers 101a, 101b function as evaporators of heat-source-side refrigerant, as well as heating the aqueous medium by making the first usage-side heat exchanger 41a function as a radiator of heat-source-side refrigerant, as shown in FIG. 4. The configuration of the heat pump system 300 is described hereinbelow.

<Configuration>

—Overall Configuration—

FIG. 4 is a schematic structural diagram of the heat pump system 300 according to the third embodiment of the present invention. The heat pump system 300 is an apparatus capable of performing an operation for heating an aqueous medium and other operation using a vapor compression heat pump cycle.

The heat pump system 300 comprises primarily a heat source unit 2, a first usage unit 4a, second usage units 10a, 10b, a discharge refrigerant communication tube 12, a liquid-refrigerant communication tube 13, a gas-refrigerant communication tube 14, a hot-water storage unit 8a, a hot-water air-warming unit 9a, an aqueous medium communication tube 15a, and an aqueous medium communication tube 16a. The heat source unit 2, the first usage unit 4a and the second usage unit 10a are connected via the refrigerant communication tubes 12, 13, 14 to thereby constitute a heat-source-side refrigerant circuit 20. The first usage unit 4a constitutes a usage-side refrigerant circuit 40a. The first usage unit 4a, the hot-water storage unit 8a, and the hot-water air-warming unit 9a are connected via the aqueous medium communication tubes 15a, 16a to thereby constitute an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility in relation to the HFC-based refrigerant is enclosed for lubrication of the heat-source-side compressor 21. HFC-134a, which is a type of HFC-based refrigerant, is enclosed inside the usage-side refrigerant circuit 40a as a usage-side refrigerant, and an ester-based or ether-based refrigeration machine oil having compatibility in relation to the HFC-based refrigerant is enclosed for lubrication of the usage-side compressor 62a. The usage-side refrigerant is preferably one in which the pressure that corresponds to a saturated gas temperature of 65° C. is a maximum gauge pressure of 2.8 MPa or less, and more preferably 2.0 MPa or less from the viewpoint of using a refrigerant that is advantageous for a high-temperature refrigeration cycle. HFC-134a is a type of refrigerant having such saturation pressure characteristics. Water as the aqueous medium circulates in the aqueous medium circuit 80a.

In the description related to the configurations below, the same reference numerals will be used and a description omitted for the configuration of the second usage units 10a, 10b, the hot-water storage unit 8a, the hot-water air-warming unit 9a, the liquid refrigerant communication tube 13, the gas-refrigerant communication tube 14, the aqueous medium communication tubes 15a, 16a, the first usage-side controller 77a, and the second usage-side controllers 108a, 108b, all of which have the same configuration as those of heat pump system 1 in the first embodiment (see FIG. 1). Only the configuration of the heat source unit 2, the discharge refrigerant communication tube 12, and the first usage unit 4a will be described.

—Heat Source Unit—

The heat source unit 2 is disposed outdoors and connected to the usage units 4a, 10a via the refrigerant communication tubes 12, 13, 14, constituting a portion of the heat-source-side refrigerant circuit 20.

The heat source unit 2 has primarily a heat-source-side compressor 21, an oil separation mechanism 22, a heat-source-side switching mechanism 23, a heat-source-side heat exchanger 24, a heat-source-side expansion valve 25, an intake return tube 26, a subcooler 27, a heat-source-side accumulator 28, a liquid-side shutoff valve 29, a gas-side shutoff valve 30, and a discharge-side shutoff valve 31.

The discharge-side shutoff valve 31 is a valve provided at the connection between the gas refrigerant communication tube 14 and a heat-source-side discharge branched tube 21d which branches from the heat-source-side discharge tube 21b which connects the discharge of the heat-source-side compressor 21 with the heat-source-side switching mechanism 23.

Aside from having the discharge-side shutoff valve 31 and the heat-source-side discharge branched tube 21d, the configuration of the heat source unit 2 is the same as in the heat pump system 1 in the first embodiment (see FIG. 1), and the same symbols are therefore used and a description is omitted.

—Discharge Refrigerant Communication Tube—

The discharge refrigerant communication tube 12 is connected to the heat-source-side discharge branch tube 21d via the discharge-side shutoff valve 31, and is a refrigerant tube capable of directing the heat-source-side refrigerant to the outside of the heat source unit 2 from the discharge of the heat-source-side compressor 21 in any of the heat-source-side radiating operation state and the heat-source-side evaporating operation state of the heat-source-side switching mechanism 23.

—First Usage Unit—

The first usage unit 4a is installed indoors, is connected to the heat source unit 2 via the refrigerant communication tubes 12, 13, and constitutes a portion of the heat-source-side refrigerant circuit 20. The first usage unit 4a is also connected to the hot-water storage unit 8a and the hot-water air-warming unit 9a via the aqueous medium communication tubes 15a, 16a, and constitutes a portion of the aqueous medium circuit 80a.

The first usage unit 4a has primarily a first usage-side heat exchanger 41a, a first usage-side flow rate adjustment valve 42a, and a circulation pump 43a.

In the first usage-side heat exchanger 41a, connected to the gas side of the flow passage through which heat-source-side refrigerant flows is a first usage-side discharge refrigerant tube 46a to which the discharge refrigerant communication tube 12 is connected, in place of the first usage-side gas refrigerant tube 54a connected to the gas refrigerant communication tube 14 such as that of the heat pump system 1 in the first embodiment (see FIG. 1). The first usage-side discharge refrigerant tube 46a is provided with a first usage-side discharge non-return valve 49a which allows the flow of heat-source-side refrigerant from the discharge refrigerant communication tube 12 to the first usage-side heat exchanger 41a and blocks the flow of heat-source-side refrigerant from the first usage-side heat exchanger 41a to the discharge refrigerant communication tube 12.

Aside from the first usage-side discharge refrigerant tube 46a being connected instead of the first usage-side gas refrigerant tube 54a, the first usage unit 4a has the same configuration as that of the heat pump system 1 in the first embodiment (see FIG. 1), and the same symbols are therefore used and a description is omitted.

The heat pump system 300 is also provided with a control part (not shown) for performing the following operations and various controls according to the settings and commands of the first and second usage-side controllers.

<Operation>

Next, the operation of the heat pump system 300 will be described.

Operating modes of the heat pump system 300 include a hot-water supply operation for performing only a hot-water supply operation of the first usage unit 4a (i.e. operation of the hot-water storage unit 8a and/or the hot-water air-warming unit 9a), an air-cooling operation for performing only an air-cooling operation of the second usage unit 10a and/or the second usage unit 10b, an air-warming operation for performing only an air-warming operation of the second usage unit 10a and/or the second usage unit 10b, a hot-water supply/air-warming operation for performing both the hot-water supply operation of the first usage unit 4a and the air-warming operation of the second usage unit 10a and/or the second usage unit 10b, and an exhaust heat hot-water supply operation for performing the hot-water supply operation of the first usage unit 4a as well as the air-cooling operation of the second usage unit 10a and/or the second usage unit 10b.

The operation of the heat pump system 300 in the five operations are described hereinbelow.

—Hot-Water Supply Operation—

When only the hot-water supply operation of the first usage unit 4a is performed, in the heat-source-side refrigerant circuit 20, the heat-source-side switching mechanism 23 is switched to a heat-source-side evaporating operation state (the state shown by the dashed lines of the heat-source-side switching mechanism 23 in FIG. 4), and the intake return expansion valve 26a and second usage-side flow rate adjustment valves 102a, 102b are put into a closed state. In the aqueous medium circuit 80a, the aqueous-medium-side switching mechanism 161a is switched to a state of feeding the aqueous medium to the hot-water storage unit 8a and/or the hot-water air-warming unit 9a. The switched state of the heat-source-side switching mechanism 23 as the thermoregulation mode is switched to the heat-source-side evaporating operation state by one of the second usage-side controllers 108a, 108b, while an operation (the hot-water supply operation) of the first usage unit 4a (and the hot-water storage unit 8a and/or the hot-water air-warming unit 9a) is performed by an operation command of the first usage-side controller 77a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, and is discharged to a heat-source-side discharge tube 21b after having been compressed to a high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. The high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a via the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 via a liquid-side shutoff valve 29. The heat-source-side refrigerant sent to the subcooler 27 does not undergo heat exchange and is sent to the heat-source-side expansion valve 25 because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of a heat-source-side liquid-refrigerant tube 24a. The low-pressure refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 via the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 via the heat-source-side intake tube 21c.

In the aqueous medium circuit 80a, the aqueous medium circulated through the aqueous medium circuit 80a is heated by the radiating of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated. The aqueous medium sent to the hot-water air-warming unit 9a is radiated in the heat exchange panel 91a, the walls and other indoor areas are thereby heated, and the indoor floor is heated.

The operation in the hot-water supply operation for performing only the hot-water supply operation of the first usage unit 4a is thus performed.

—Air-Cooling Operation—

In the case of performing only the air-cooling operation of the second usage unit 10a and/or the second usage unit 10b, the heat-source-side switching mechanism 23 is switched to the heat-source-side radiating operation state (indicated by solid lines in the heat-source-side switching mechanism 23 in FIG. 4), and the first usage-side flow rate adjustment valve 42a is closed in the heat-source-side refrigerant circuit 20. The switched state of the heat-source-side switching mechanism 23 as the thermoregulation mode is switched to the heat-source-side radiating operation state by one of the second usage-side controllers 108a, 108b, and an operation (the air-cooling operation) of the second usage unit 10a and/or the second usage unit 10b is performed by an operation command of the second usage-side controller 108a and/or the second usage-side controller 108b. The air-cooling operation is not described herein because it is identical to the air-cooling operation in the heat pump system 1 of the first embodiment.

—Air-Warming Operation—

In the case of performing only the air-warming operation of the second usage unit 10a and/or the second usage unit 10b, the heat-source-side switching mechanism 23 is switched to the heat-source-side radiating operation state (indicated by dashed lines in the heat-source-side switching mechanism 23 in FIG. 4), and the intake return expansion valve 26a and the first usage-side flow rate adjustment valve 42a are closed in the heat-source-side refrigerant circuit 20. The switched state of the heat-source-side switching mechanism 23 as the thermoregulation mode is switched to the heat-source-side evaporating operation state by one of the second usage-side controllers 108a, 108b, and an operation (the air-warming operation) of the second usage unit 10a and/or the second usage unit 10b is performed by an operation command of the second usage-side controller 108a and/or the second usage-side controller 108b. The air-warming operation is not described herein because it is identical to the air-warming operation in the heat pump system 1 of the first embodiment.

—Hot-Water Supply/Air-Warming Operation—

In the case of performing the hot-water supply operation of the first usage unit 4a as well as the air-warming operation of the second usage unit 10a and/or the second usage unit 10b, the heat-source-side switching mechanism 23 is switched to the heat-source-side evaporating operation state (indicated by dashed lines in the heat-source-side switching mechanism 23 in FIG. 4), and the intake return expansion valve 26a is closed in the heat-source-side refrigerant circuit 20. In the aqueous medium circuit 80a, the aqueous-medium-side switching mechanism 161a is switched to a state in which the aqueous medium is fed to the hot-water storage unit 8a and/or the hot-water air-warming unit 9a. The switched state of the heat-source-side switching mechanism 23 as the thermoregulation mode is switched to the heat-source-side evaporating operation state by one of the second usage-side controllers 108a, 108b, an operation (the hot-water supply operation) of the first usage unit 4a (and the hot-water storage unit 8a and/or the hot-water air-warming unit 9a) is performed by an operation command of the first usage-side controller 77a, and an operation (the air-warming operation) of the second usage unit 10a and/or the second usage unit 10b is performed by an operation command of the second usage-side controller 108a and/or the second usage-side controller 108b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. A portion of the high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31, and the remainder is sent from the heat source unit 2 to the gas refrigerant communication tube 14 through the second heat-source-side gas refrigerant tube 23b and the gas-side shutoff valve 30.

The high-pressure heat-source-side refrigerant sent to the gas refrigerant communication tube 14 is sent to the second usage units 10a, 10b (in this description, both of the second usage units 10a, 10b are performing the air-warming operation). The high-pressure heat-source-side refrigerant sent to the second usage units 10a, 10b is sent to the second usage-side heat exchangers 101a, 101b through the second usage-side gas refrigerant tubes 104a, 104b. The high-pressure heat-source-side refrigerant sent to the second usage-side heat exchangers 101a, 101b undergoes heat exchange in the second usage-side heat exchangers 101a, 101b with the air medium fed by the usage-side fans 105a, 105b and the refrigerant radiates heat, whereby indoor air warming is performed. Having radiated heat in the second usage-side heat exchangers 101a, 101b, the high-pressure heat-source-side refrigerant is sent from the second usage units 10a, 10b to the liquid refrigerant communication tube 13 through the second usage-side flow rate adjustment valves 102a, 102b and the second usage-side liquid refrigerant tubes 103a, 103b.

The high-pressure heat-source-side refrigerant sent to the discharge refrigerant communication tube 12 is sent to the first usage unit 4a. The high-pressure heat-source-side refrigerant sent to the first usage unit 4a is sent to the first usage-side heat exchanger 41a through the first usage-side discharge refrigerant tube 46a and the first usage-side discharge non-return valve 49a. The high-pressure heat-source-side refrigerant sent to the first usage-side heat exchanger 41a is heat-exchanged with the aqueous medium circulated through the aqueous medium circuit 80a by the circulation pump 43a and radiated in the first usage-side heat exchanger 41a. The high-pressure heat-source-side refrigerant radiated in the first usage-side heat exchanger 41a is sent from the first usage unit 4a to the liquid refrigerant communication tube 13 through the first usage-side flow rate adjustment valve 42a and the first usage-side liquid refrigerant tube 45a.

The heat-source-side refrigerant sent from the second usage units 10a, 10b and the first usage unit 4a to the liquid refrigerant communication tube 13 is merged in the liquid refrigerant communication tube 13 and sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without undergoing heat exchange. The heat-source-side refrigerant sent to the heat-source-side expansion valve 25 is depressurized in the heat-source-side expansion valve 25 to a low-pressure gas-liquid two-phase state and sent to the heat-source-side heat exchanger 24 through the heat-source-side liquid refrigerant tube 24a. The low-pressure refrigerant sent to the heat-source-side heat exchanger 24 undergoes heat exchange in the heat-sourceside heat exchanger 24 with the outdoor air fed by the heat-source-side fan 32, and the refrigerant evaporates. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the aqueous medium circuit 80a, the aqueous medium circulated through the aqueous medium circuit 80a is heated by the radiating of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a is heat-exchanged with the aqueous medium in the hot-water storage tank 81a and radiated in the heat exchange coil 82a, and the aqueous medium in the hot-water storage tank 81a is thereby heated. The aqueous medium sent to the hot-water air-warming unit 9a is radiated in the heat exchange panel 91a, the walls and other indoor areas are thereby heated, and the indoor floor is heated.

The operation is thus performed in the hot-water supply/air-warming operation for performing the hot-water supply operation of the first usage unit 4a as well as the air-warming operation of the second usage unit 10a and/or the second usage unit 10b.

—Exhaust Heat Hot-Water Supply Operation—

In the case of performing the exhaust heat hot-water supply operation for performing the hot-water supply operation of the first usage unit 4a as well as the air-cooling operation of the second usage unit 10a and/or the second usage unit 10b, the heat-source-side switching mechanism 23 is switched to the heat-source-side radiating operation state (indicated by the solid lines in the heat-source-side switching mechanism 23 in FIG. 4) in the heat-source-side refrigerant circuit 20. In the aqueous medium circuit 80a, the aqueous-medium-side switching mechanism 161a is switched to a state in which the aqueous medium is fed to the hot-water storage unit 8a. The switched state of the heat-source-side switching mechanism 23 as the thermoregulation mode is switched to the heat-source-side evaporating operation state by one of the second usage-side controllers 108a, 108b, while an operation (the hot-water supply operation) of the first usage unit 4a (and the hot-water storage unit 8a and/or the hot-water air-warming unit 9a) is performed by an operation command of the first usage-side controller 77a and an operation (the air-cooling operation) of the second usage unit 10a and/or the second usage unit 10b is performed by an operation command of the second usage-side controller 108a and/or the second usage-side controller 108b.

In the heat-source-side refrigerant circuit 20 in such a state, the heat-source-side refrigerant at a low pressure in the refrigeration cycle is drawn into the heat-source-side compressor 21 through the heat-source-side intake tube 21c and compressed to a high pressure in the refrigeration cycle, and subsequently discharged to the heat-source-side discharge tube 21b. In the oil separator 22a, the refrigeration machine oil is separated from the high-pressure heat-source-side refrigerant discharged to the heat-source-side discharge tube 21b. The refrigeration machine oil separated from the heat-source-side refrigerant in the oil separator 22a is returned to the heat-source-side intake tube 21c through the oil return tube 22b. A portion of the high-pressure heat-source-side refrigerant from which the refrigeration machine oil has been separated is sent from the heat source unit 2 to the discharge refrigerant communication tube 12 through the heat-source-side discharge branch tube 21d and the discharge-side shutoff valve 31, and the remainder is sent to the heat-source-side heat exchanger 24 through the heat-source-side switching mechanism 23 and the first heat-source-side gas refrigerant tube 23a. The high-pressure heat-source-side refrigerant sent to the heat-source-side heat exchanger 24 is heat-exchanged with the outdoor air fed by the heat-source-side fan 32 and radiated in the heat-source-side heat exchanger 24. The high-pressure heat-source-side refrigerant radiated in the heat-source-side heat exchanger is sent to the subcooler 27 through the heat-source-side expansion valve 25. The heat-source-side refrigerant sent to the subcooler 27 is heat-exchanged with the heat-source-side refrigerant diverted to the intake return tube 26 from the heat-source-side liquid refrigerant tube 24a, and is cooled to a subcooled state. The heat-source-side refrigerant flowing through the intake return tube 26 is returned to the heat-source-side intake tube 21c. The heat-source-side refrigerant cooled in the subcooler 27 is sent from the heat source unit 2 to the liquid refrigerant communication tube 13 through the heat-source-side liquid refrigerant tube 24a and the liquid-side shutoff valve 29.

The high-pressure heat-source-side refrigerant sent to the discharge refrigerant communication tube 12 is sent to the first usage unit 4a. The high-pressure heat-source-side refrigerant sent to the first usage unit 4a is sent to the first usage-side heat exchanger 41a through the first usage-side discharge refrigerant tube 46a and the first usage-side discharge non-return valve 49a. The high-pressure heat-source-side refrigerant sent to the first usage-side heat exchanger 41a is heat-exchanged with the aqueous medium circulated through the aqueous medium circuit 80a by the circulation pump 43a and radiated in the first usage-side heat exchanger 41a. The high-pressure heat-source-side refrigerant radiated in the first usage-side heat exchanger 41a is sent from the first usage unit 4a to the liquid refrigerant communication tube 13 through the first usage-side flow rate adjustment valve 42a and the first usage-side liquid refrigerant tube 45a.

The heat-source-side refrigerant sent from the heat source unit 2 and the first usage unit 4a to the liquid refrigerant communication tube 13 is merged in the liquid refrigerant communication tube 13 and sent to the second usage units 10a, 10b (both the second usage units 10a, 10b are performing the air-cooling operation in this description). The heat-source-side refrigerant sent to the second usage units 10a, 10b is sent to the second usage-side flow rate adjustment valves 102a, 102b. The heat-source-side refrigerant sent to the second usage-side flow rate adjustment valves 102a, 102b is depressurized in the second usage-side flow rate adjustment valves 102a, 102b to a low-pressure gas-liquid two-phase state and sent to the second usage-side heat exchangers 101a, 101b through the second usage-side liquid refrigerant tubes 103a, 103b. The low-pressure heat-source-side refrigerant sent to the second usage-side heat exchangers 101a, 101b undergoes heat exchange in the second usage-side heat exchangers 101a, 101b with the air medium fed by the usage-side fans 105a, 105b and the refrigerant evaporates, thereby performing air-cooling of the room interior. The low-pressure heat-source-side refrigerant evaporated in the second usage-side heat exchangers 101a, 101b is sent from the second usage units 10a, 10b to the gas refrigerant communication tube 14 through the second usage-side gas refrigerant tubes 104a, 104b.

The low-pressure heat-source-side refrigerant sent to the gas refrigerant communication tube 14 is sent to the heat source unit 2. The low-pressure heat-source-side refrigerant sent to the heat source unit 2 is sent to the heat-source-side accumulator 28 through the gas-side shutoff valve 30, the second heat-source-side gas refrigerant tube 23b, and the heat-source-side switching mechanism 23. The low-pressure heat-source-side refrigerant sent to the heat-source-side accumulator 28 is again drawn into the heat-source-side compressor 21 through the heat-source-side intake tube 21c.

In the aqueous medium circuit 80a, the aqueous medium circulating in the aqueous medium circuit 80a is heated by the heat radiation of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a undergoes heat exchange in the heat exchange coil 82a with the aqueous medium in the hot-water storage tank 81a, heat is radiated, and the aqueous medium in the hot-water storage tank 81a is thereby heated.

The operation in the exhaust heat hot-water supply operation for performing the hot-water supply operation of the first usage unit 4a as well as the air-cooling operation of the second usage unit 10a and/or the second usage unit 10b is thus performed.

Thus, when the exhaust heat hot-water supply operation is performed in this heat pump system 300, the hot-water supply operation can be performed even while the thermoregulation mode is left switched to the heat-source-side radiating operation state, but when such an exhaust heat hot-water supply operation is performed, a hot-water supply operation is performed according to the heat radiation load in the first usage-side heat exchanger 41a that is proportionate to the evaporation load in the second usage-side heat exchangers 101a, 101b, and it is therefore sometimes not possible to provide for the desired hot water supply load, in which case the thermoregulation mode must be switched to the heat-source-side evaporating operation state to perform the hot-water supply operation. The air-cooling operation and air-warming operation are sometimes performed as necessary during times such as spring or autumn, in which case the thermoregulation mode must be switched. Specifically, there must be a switch in the thermoregulation mode even with a configuration capable of performing the exhaust heat hot-water supply operation such as that of the heat pump system 300, which means that in this heat pump system 300 as well, the first usage unit 4a and the second usage units 10a, 10b are incapable of individually selecting and operating the hot-water supply operation, the air-cooling operation, or the air-warming operation.

—Thermoregulation Mode Switching Control—

However, since users simply recognize this heat pump system 300 as being both an air-cooling and air-warming apparatus due to the second usage units 10a, 10b and a hot water supply apparatus due to the first usage unit 4a and other components, similar to the heat pump system 1 of the first embodiment, users fail to recognize the necessity of switching the thermoregulation mode and forget to switch the thermoregulation mode, switching mistakes may occur, and switching the thermoregulation mode is complicated.

In view of this, in this heat pump system 300, thermoregulation mode switching control is performed, whereby operation is switched to a thermoregulation mode different from the switched state of the heat-source-side switching mechanism 23 as the thermoregulation mode commanded by one of the second usage-side controllers 108a, 108b (the second usage-side controller 108a in this case) which issue commands to the second usage units 10a, 10b.

Figure 5:
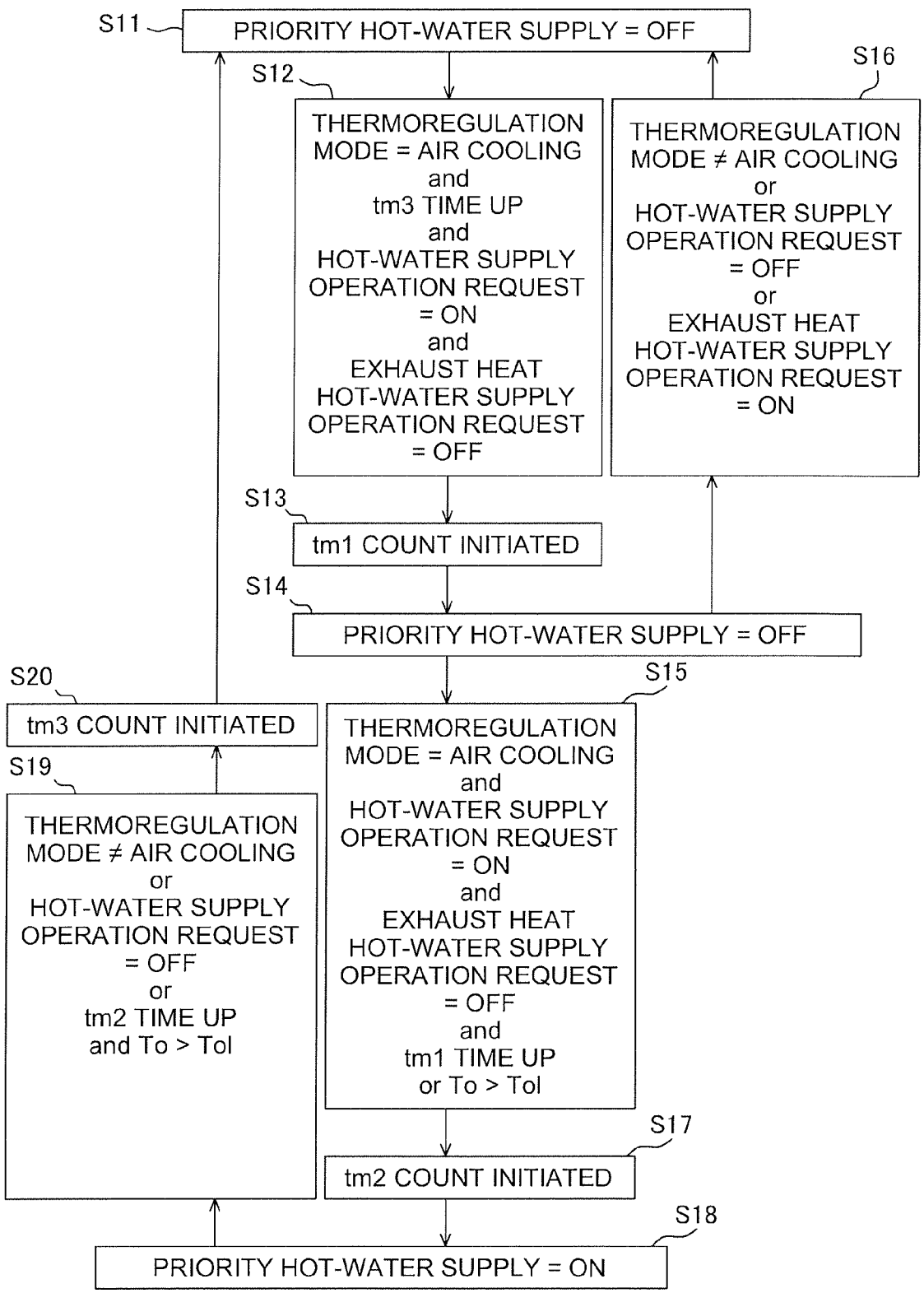
FIG. 5 is a control block of thermoregulation mode switching control in the third embodiment and fourth embodiment.

Hereinbelow, FIG. 5 is used to describe a control logic block diagram of the thermoregulation mode switching control in this heat pump system 300. In this thermoregulation mode switching control, when a hot-water supply operation command is issued from the first usage-side controller 77a to the first usage unit 4a (consequently, when the thermoregulation mode must be the heat-source-side evaporating operation state) while the thermoregulation mode is in the heat-source-side radiating operation state (i.e., the second usage units 10a, 10b are performing the air-cooling operation, or if they are not performing the air-cooling operation, the second usage-side controller 108a issues a command that the thermoregulation mode be the heat-source-side radiating operation state), the thermoregulation mode is switched to the heat-source-side evaporating operation state and a priority hot-water supply operation (steps S17 to S19) is performed, which is an operation in which the hot-water supply operation of the first usage unit 4a is performed; otherwise the operation (steps S11, S14) in the commanded thermoregulation mode (the thermoregulation mode commanded by the second usage-side controller 108a in this case) is performed.

First, the operation state of S11 is continued, i.e., the operation in the thermoregulation mode commanded by the second usage-side controller 108a (in FIG. 5, this operation is "priority hot-water supply operation=OFF") is continued.

Next, in step S12, a determination is made of whether or not a condition A is satisfied. Condition A is that the thermoregulation mode commanded by the second usage-side controller 108a be the heat-source-side radiating operation state (in FIG. 5, this state is "thermoregulation mode"=air cooling), that a predetermined third time duration tm3 has elapsed (in FIG. 5, this state is "tm3 time up"), whether or not a command for the hot-water supply operation has been issued by the first usage-side controller 77a to the first usage unit 4a (in FIG. 5, this command-issued state is "hot-water supply operation request=ON"), and whether or not the exhaust heat hot-water supply operation has not yet been performed in which the hot-water supply operation of the first usage unit 4a is performed during the air-cooling operation of the second usage units 10a, 10b (in FIG. 5, this state of the exhaust heat hot-water supply operation having not been performed is "exhaust heat hot-water supply operation request=OFF"); thereby determining whether or not a command for the hot-water supply operation has been issued to the first usage unit 4a while the thermoregulation mode is in the heat-source-side radiating operation state. The time duration tm3 is a time duration set in step S20 described hereinafter. In cases during the exhaust heat hot-water supply operation in which the hot-water storage temperature Twh of the hot-water storage unit 8a is equal to or less than a predetermined hot-water storage set temperature Twhs while the air-cooling operation is being performed, the first usage unit 4a automatically performs the hot-water supply operation for heating the aqueous medium by the heat radiation of the heat-source-side refrigerant in the first usage-side heat exchanger 41a. When it has been determined in step S12 that condition A is not satisfied, i.e., either when the thermoregulation mode is in the heat-source-side evaporating operation state (in FIG. 5, this state is "thermoregulation mode≠air cooling"), when the third time duration tm3 has not elapsed, or when a command for the hot-water supply operation has not been issued by the first usage-side controller 77a to the first usage unit 4a (i.e. "hot-water supply operation request=OFF"), the operation in the thermoregulation mode commanded by the second usage-side controller 108a (i.e., "priority hot-water supply operation=OFF") is continued. When it is determined that condition A is satisfied, the thermoregulation mode is in the heat-source-side radiating operation state, and it is not possible to provide for the desired hot-water supply load in the exhaust heat hot-water supply operation (the hot-water supply load is large and the hot-water storage temperature Twh cannot reach the predetermined hot-water storage set temperature Twhs or higher in the exhaust heat hot-water supply operation); therefore, the process transitions to step S13 and onward, preparing for the priority hot-water supply operation (steps S17 to S19).

Next, in steps S13 and S14, when condition A is satisfied, instead of transitioning immediately to the priority hot-water supply operation (steps S17 to S19), the count of a predetermined first time duration tm1 is initiated in step S13, and the operation in the thermoregulation mode commanded by the second usage-side controller 108a (i.e. "priority hot-water supply operation=OFF") is continued similar to step S11. The first time duration tm1 is equivalent to a time interval from the end of the process of step S12 until the start of the processes of steps S15 and S16, and is set somewhere between about several and ten minutes.

Next, in step S15, a determination is made of whether or not a condition B is satisfied. Condition B is that the thermoregulation mode commanded by the second usage-side controller 108a is in the heat-source-side radiating operation state (i.e. "thermoregulation mode=air cooling"), whether or not a hot-water supply operation command has been issued by the first usage-side controller 77a to the first usage unit 4a (i.e. "hot-water supply operation request=ON"), whether or not the exhaust heat hot-water supply operation has not yet been performed in which the hot-water supply operation of the first usage unit 4a is performed during the air-cooling operation of the second usage units 10a, 10b (i.e. "exhaust heat hot-water supply operation request=OFF"), and either whether or not the first time duration tm1 has elapsed (in FIG. 5, this state is "tm1 time up") or whether or not the outside air temperature To is lower than a predetermined low-temperature condition temperature To1 (in FIG. 5, this state is "To<To1"), thereby determining if condition A has continued to be satisfied for the first time duration tm1 and the hot-water supply operation request is reliable in step S12 (for example, a state in which it is not possible to provide for the desired hot-water supply load in the exhaust heat hot-water supply operation), or if the thermoregulation mode commanded by the second usage-side controller 108a is in the heat-source-side radiating operation state (i.e. "thermoregulation mode=air cooling") regardless of the outside air temperature To being in low-temperature conditions. The low-temperature condition temperature To1 is equivalent to the highest temperature at which the air-warming operation of the second usage units 10a, 10b is assumed to be performed, and is set to about 15° C. When it has been determined in step S15 that condition B is not satisfied, i.e., when either the thermoregulation mode is in the heat-source-side evaporating operation state (i.e. "thermoregulation mode≠air cooling"), a hot-water supply operation command has not been issued by the first usage-side controller 77a to the first usage unit 4a (i.e. "hot-water supply operation request=OFF"), or the exhaust heat hot-water supply operation has been performed in which the hot-water supply operation of the first usage unit 4a is performed during the air-cooling operation of the second usage units 10a, 10b (in FIG. 5, the state of the exhaust heat hot-water supply operation being performed is "exhaust heat hot-water supply operation request=ON"); a condition D of step S16 is determined to be satisfied and the operation in the thermoregulation mode commanded by the second usage-side controller 108a of step S11 (i.e. "priority hot-water supply operation=OFF") is continued, and when condition B is determined to be satisfied, either the hot-water supply operation request is reliable or the thermoregulation mode commanded by the second usage-side controller 108a is in the heat-source-side radiating operation state (i.e. "thermoregulation mode=air cooling") regardless of the outside air temperature To being in low-temperature conditions, and the process therefore transitions to the priority hot-water supply operation (steps S17 to S19).

Next, in steps S17 to S19, first a count of a predetermined second time duration tm2 is initiated in step S17. The second time duration tm2 is equivalent to the time duration in which the priority hot-water supply operation is performed, and is set somewhere between 10 and 30 minutes. In step S18, regardless of the second usage-side controller 108a having issued a command that the thermoregulation mode be in the heat-source-side radiating operation state (i.e. "thermoregulation mode=air cooling"), the thermoregulation mode is switched to the heat-source-side evaporating operation state, and the circulation pump 43a is started up, the first usage-side flow rate adjustment valve 42a opened, and other operations performed to initiate the hot-water supply operation of the first usage unit 4a (i.e. the priority hot-water supply operation).

To perform this manner of priority hot-water supply operation, when the thermoregulation mode is switched from the heat-source-side radiating operation state to the heat-source-side evaporating operation state, the second usage units 10a, 10b are switched to a state of performing the air-warming operation, and when the second usage units 10a, 10b have been performing the air-cooling operation until the priority hot-water supply operation is initiated, the second usage units 10a, 10b go into a state of performing the air-warming operation, and the air-warming operation is initiated when an air-cooling operation command is issued from the second usage-side controllers 108a, 108b to the second usage units 10a, 10b during the priority hot-water supply operation, which compromises the level of comfort in the room and is therefore undesirable. In view of this, in this heat pump system 300, the air-cooling operation of the second usage units 10a, 10b is prohibited during the priority hot-water supply operation, similar to the heat pump system 1 of the first embodiment.

When the air-cooling operation of the second usage units 10a, 10b is prohibited during the priority hot-water supply operation as described above and the operation of the usage-side fans 105a, 105b is stopped in the second usage units 10a, 10b which have been issued commands for the air-cooling operation from the second usage-side controllers 108a, 108b, there is a risk of the user misinterpreting that a malfunction has occurred in the second usage units 10a, 10b. In view of this, in this heat pump system 300, the usage-side fans 105a, 105b are operated in a state in which the second usage-side flow rate adjustment valves 102a, 102b have been closed to stop the air-cooling operation during the priority hot-water supply operation in the second usage units 10a, 10b which have been issued commands for the air-cooling operation from the second usage-side controllers 108a, 108b, similar to the heat pump system 1 of the first embodiment. The operating frequencies of the usage-side fans 105a, 105b are preferable the minimum frequency here in order to prevent drafts in the room.

Furthermore, when the operation state displays of the second usage units 10a, 10b are changed in the second usage-side controllers 108a, 108b (i.e., the air-cooling operation is changed to stop) in conjunction with the stopping of the air-cooling operation of the second usage units 10a, 10b during the priority hot-water supply operation as described above, there is a risk of the user misinterpreting that a malfunction has occurred in the second usage units 10a, 10b. In view of this, in this heat pump system 300, the second usage-side controllers 108a, 108b continue the display stating that the air-cooling operation is in effect even when the air-cooling operation of the second usage units 10a, 10b is stopped during the priority hot-water supply operation, similar to the heat pump system 1 of the first embodiment.

The priority hot-water supply operation is then continued until a condition C is satisfied in step S19. Condition C is that either a command that the thermoregulation mode be switched to the heat-source-side evaporating operation state has been issued by the second usage-side controller 108a (i.e. "thermoregulation mode≠air cooling"), a command that the hot-water supply operation be stopped has been issued by the first usage-side controller 77a to the first usage unit 4a (i.e. "hot-water supply operation request=OFF"), or the second time duration tm2 has elapsed (in FIG. 5 this state is "tm2 time up") in a state in which the outside air temperature To is higher than a predetermined high-temperature condition temperature Toh (in FIG. 5 this state is "To>Toh"); whereby it is determined in step S19 that either it is possible to perform the hot-water supply operation without performing the priority hot-water supply operation, the hot-water supply operation is not necessary, or the priority hot-water supply operation has continued for the second time duration tm2. The high-temperature condition temperature Toh is equivalent to the lowest temperature at which the air-cooling operation of the second usage units 10a, 10b is assumed to be performed, and is set to about 20° C. The priority hot-water supply operation is then continued until condition C is determined to be satisfied in step S19, i.e., until either it becomes possible to perform the hot-water supply operation without performing the priority hot-water supply operation, the hot-water supply operation becomes unnecessary, or the priority hot-water supply operation has continued for the second time duration tm2; after which the process transitions (steps S20, S11) to resuming the operation in the thermoregulation mode commanded by the second usage-side controller 108a.

Next, in steps S20 and S11, first a count of the predetermined third time duration tm3 is initiated in step S20, and then a process is performed in step S11 of resuming the operation in the thermoregulation mode commanded by the second usage-side controller 108a. The third time duration tm3 is equivalent to the time duration during which the operation is performed in the thermoregulation mode commanded by the second usage-side controller 108a without performing the priority hot-water supply operation when the priority hot-water supply operation has been requested, and the third time duration tm3 is set somewhere between 5 and 25 minutes. When the hot-water supply operation of the first usage unit 4a has been requested during the air-cooling operation of the second usage units 10a, 10b, for example, the priority hot-water supply operation is performed for the second time duration tm2 and the air-cooling operation is performed for the third time duration tm3.

Due to the thermoregulation mode switching control described above, in this heat pump system 300, when either the operation of the second usage units 10a, 10b has been stopped or the air-cooling operation is being performed (i.e. when the thermoregulation mode commanded by the second usage-side controller 108a is the heat-source-side radiating operation state), and also when the hot-water supply operation has been requested of the second usage unit 10a (i.e. a hot-water supply operation command has been issued from the first usage-side controller 77a to the first usage unit 4a), the thermoregulation mode can be switched to the heat-source-side evaporating operation state and the priority hot-water supply operation can be performed regardless of the second usage-side controller 108a commanding that the thermoregulation mode be the heat-source-side radiating operation state, i.e., the operation can be switched to a thermoregulation mode different from the switched state of the heat-source-side switching mechanism 23 as the thermoregulation mode commanded by the second usage-side controller 108a.

The same operational effects as those of the heat pump system 1 of the first embodiment can thereby be achieved in the heat pump system 300 as well.

Fourth Embodiment

In the heat pump system 200 of the second embodiment described above (see FIG. 3), since the air-cooling operation of the second usage units 10a, 10b cannot be performed together with the hot-water supply operation of the first usage unit 4a, if it were possible to perform such an operation (hereinbelow referred to as the "exhaust heat hot-water supply operation"), it would also be possible to perform a hot-water supply operation according to the heat radiation load (i.e. the hot-water supply load) in the first usage-side heat exchanger 4a that is proportionate to the evaporation load (i.e. the air-cooling load) in the second usage-side heat exchangers 101a, 101b in an operation state such as summer when the air-cooling operation is performed, which would be preferable in terms of conserving energy.

Figure 6:
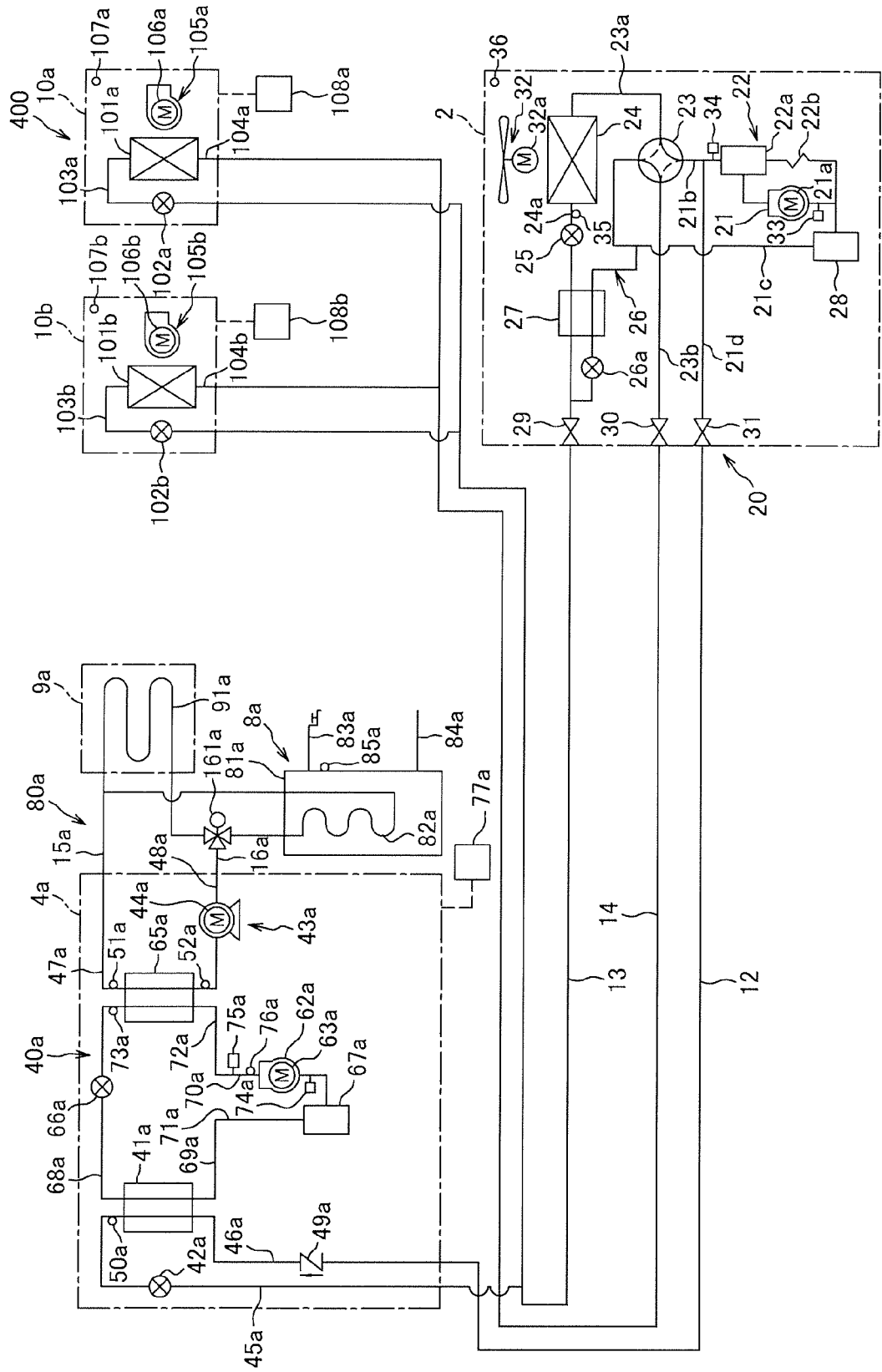
FIG. 6 is a schematic structural diagram of the heat pump system according to the fourth embodiment of the present invention.

In view of this, the heat pump system 400 has the configuration of the heat pump system 200 according to the second embodiment described above (see FIG. 3), wherein an exhaust heat hot-water supply operation can be performed, which is an operation of cooling the air medium by making the second usage-side heat exchangers 101a, 101b function as evaporators of heat-source-side refrigerant, as well as heating the aqueous medium by making the first usage-side heat exchanger 41a function as a radiator of heat-source-side refrigerant, as shown in FIG. 6. The configuration of the heat pump system 400 is described hereinbelow.

<Configuration>
—Overall Configuration—

FIG. 6 is a schematic structural diagram of the heat pump system 400 according to the fourth embodiment of the present invention. The heat pump system 400 is an apparatus capable of performing an operation for heating an aqueous medium, and other operation using a vapor compression heat pump cycle.

The heat pump system 400 comprises primarily a heat source unit 2, a first usage unit 4a, second usage units 10a, 10b, a discharge refrigerant communication tube 12, a liquid-refrigerant communication tube 13, a gas-refrigerant communication tube 14, a hot-water storage unit 8a, a hot-water air-warming unit 9a, an aqueous medium communication tube 15a, and an aqueous medium communication tube 16a. The heat source unit 2, the first usage unit 4a, and the second usage unit 10a are connected via the refrigerant communication tubes 12, 13, 14 to thereby constitute a heat-source-side refrigerant circuit 20. The first usage unit 4a constitutes a usage-side refrigerant circuit 40a. The first usage unit 4a, the hot-water storage unit 8a, and the hot-water air-warming unit 9a are connected via the aqueous medium communication tubes 15a, 16a to thereby constitute an aqueous medium circuit 80a. HFC-410A, which is a type of HFC-based refrigerant, is enclosed inside the heat-source-side refrigerant circuit 20 as a heat-source-side refrigerant, and an ester-based or ether-based refrigeration machine oil having compatibility in relation to the HFC-based refrigerant is enclosed for lubrication of the heat-source-side compressor 21. HFC-134a, which is a type of HFC-based refrigerant, is enclosed inside the usage-side refrigerant circuit 40a as a usage-side refrigerant, and an ester-based or ether-based refrigeration machine oil having compatibility in relation to the HFC-based refrigerant is enclosed for lubrication of the usage-side compressor 62a. The usage-side refrigerant is preferably one in which the pressure that corresponds to a saturated gas temperature of 65° C. is a maximum gauge pressure of 2.8 MPa or less, and more preferably 2.0 MPa or less from the viewpoint of using a refrigerant that is advantageous for a high-temperature refrigeration cycle. HFC-134a is a type of refrigerant having such saturation pressure characteristics. Water as the aqueous medium circulates in the aqueous medium circuit 80a.

In the configuration of the heat pump system 400, the configurations of the second usage units 10a, 10b, the hot-water storage unit 8a, the hot-water air-warming unit 9a, the liquid refrigerant communication tube 13, the gas-refrigerant communication tube 14, the aqueous medium communication tubes 15a, 16a, the first usage-side controller 77a, and the second usage-side controllers 108a, 108b are the same as those of the heat pump system 200 in the second embodiment (see FIG. 3), and the configurations of the heat source unit 2 and the discharge refrigerant communication tube 12 are the same as those of the heat pump system 300 in the third embodiment (see FIG. 4). Therefore, the same reference symbols are used and descriptions omitted for these configurations, and only the configuration of the first usage unit 4a will be described.

—First Usage Unit—

The first usage unit 4a is disposed indoors and connected to the heat source unit 2 and the second usage unit 10 via the refrigerant communication tubes 12, 13, constituting a portion of the heat-source-side refrigerant circuit 20. The first usage unit 4a constitutes the usage-side refrigerant circuit 40a. Furthermore, the first usage unit 4a is connected to the hot-water storage unit 8a and the hot-water air-warming unit 9a via the aqueous medium communication tubes 15a, 16a, constituting a portion of aqueous medium circuit 80a.

The first usage unit 4a mainly has the first usage-side heat exchanger 41a, the first usage-side flow rate adjustment valve 42a, the usage-side compressor 62a, the refrigerant/water heat exchanger 65a, a refrigerant/water heat exchange-side flow rate adjustment valve 66a, a usage-side accumulator 67a, and a circulation pump 43a.

In the first usage-side heat exchanger 41a, connected to the gas side of the flow passage through which heat-source-side refrigerant flows is a first usage-side discharge refrigerant tube 46a to which the discharge refrigerant communication tube 12 is connected, in place of the first usage-side gas refrigerant tube 54a connected to the gas refrigerant communication tube 14 such as that of the heat pump system 200 in the second embodiment (see FIG. 3). The first usage-side discharge refrigerant tube 46a is provided with a first usage-side discharge non-return valve 49a which allows the flow of heat-source-side refrigerant from the discharge refrigerant communication tube 12 to the first usage-side heat exchanger 41a and blocks the flow of heat-source-side refrigerant from the first usage-side heat exchanger 41a to the discharge refrigerant communication tube 12.

Aside from the first usage-side discharge refrigerant tube 46a being connected instead of the first usage-side gas refrigerant tube 54a, the first usage unit 4a has the same configuration as that of the heat pump system 200 in the second embodiment (see FIG. 3), and the same symbols are therefore used and a description is omitted.

The heat pump system 400 is also provided with a control part (not shown) for performing the following operations and various controls according to the settings and commands of the first and second usage-side controllers.

<Operation>

Next, the operation of the heat pump system 400 will be described.

The operations of the heat pump system 400 include a hot-water supply operation for performing only the hot-water supply operation (i.e. operation of the hot-water storage unit 8a and/or the hot-water air-warming unit 9a) of the first usage unit 4a, an air-cooling operation for performing only the air-cooling operation of the second usage unit 10a and/or the second usage unit 10b, an air-warming operation for performing only the air-warming operation of the second usage unit 10a and/or the second usage unit 10b, a hot-water supply/air-warming operation for performing the hot-water supply operation of the first usage unit 4a as well as the air-warming operation of the second usage unit 10a and/or the second usage unit 10b, and an exhaust heat hot-water supply operation for performing the hot-water supply operation of the first usage unit 4a as well as the air-cooling operation of the second usage unit 10a and/or the second usage unit 10b.

The operation in the five operations of the heat pump system 400 is described hereinbelow.

—Hot-Water Supply Operation—

In the case of performing only the hot-water supply operation of the first usage unit 4a, the heat-source-side switching mechanism 23 is switched to the heat-source-side evaporating operation state (indicated by dashed lines in the heat-source-side switching mechanism 23 in FIG. 6), and the intake return expansion valve 26a and the second usage-side flow rate adjustment valves 102a, 102b are closed in the heat-source-side refrigerant circuit 20. In the aqueous medium circuit 80a, the aqueous-medium-side switching mechanism 161a is switched to the state of feeding the aqueous medium to the hot-water storage unit 8a and/or the hot-water air-warming unit 9a. The switched state of the heat-source-side switching mechanism 23 as the thermoregulation mode is switched here to the heat-source-side evaporating operation state by one of the second usage-side controllers 108a, 108b, while an operation (hot-water supply operation) of the first usage unit 4a (and the hot-water storage unit 8a and/or the hot-water air-warming unit 9a) is performed by an operation command of the first usage-side controller 77a.

In the heat-source-side refrigerant circuit 20 in such a state, the low-pressure, heat-source-side refrigerant in the refrigeration cycle is taken into the heat-source-side compressor 21 by way of the heat-source-side intake tube 21c, and is discharged to a heat-source-side discharge tube 21b after having been compressed to a high pressure in the refrigeration cycle. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b.

The high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a via the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 via the first usage-side flow rate adjustment valve 42a and the first usage-side liquid refrigerant tube 45a.

The heat-source-side refrigerant sent to the liquid refrigerant communication tube 13 is sent to the heat source unit 2. The heat-source-side refrigerant sent to the heat source unit 2 is sent to the subcooler 27 via a liquid-side shutoff valve 29. The heat-source-side refrigerant sent to the subcooler 27 does not undergo heat exchange and is sent to the heat-source-side expansion valve 25 because the heat-source-side refrigerant does not flow in the intake return tube 26. The heat-source-side refrigerant sent to the heat-source-side expansion valve 25 is depressurized in the heat-source-side expansion valve 25 to become a low-pressure gas-liquid two-phase state, and is then sent to the heat-source-side heat exchanger 24 by way of a heat-source-side liquid-refrigerant tube 24a. The low-pressure refrigerant sent to the heat-source-side heat exchanger 24 undergoes heat exchange with outdoor air fed by the heat-source-side fan 32 and is evaporated in the heat-source-side heat exchanger 24. The low-pressure, heat-source-side refrigerant evaporated in the heat-source-side heat exchanger 24 is sent to the heat-source-side accumulator 28 via the first heat-source-side gas-refrigerant tube 23a and the heat-source-side switching mechanism 23. The low-pressure, heat-source-side refrigerant sent to the heat-source-side accumulator 28 is again taken into the heat-source-side compressor 21 via the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a via the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a via the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulated through the aqueous medium circuit 80a is heated by the heat radiation of the usage-side refrigerant in the refrigerant-water heat exchanger 65a. The aqueous medium heated in the refrigerant-water heat exchanger 65a is drawn into the circulation pump 43a through the first usage-side water outlet tube 48a and pressurized, and subsequently sent from the first usage unit 4a to the aqueous medium communication tube 16a. The aqueous medium sent to the hot-water storage unit 8a undergoes heat exchange in the heat exchange coil 82a with the aqueous medium in the hot water storage tank 81a and radiates heat, whereby the aqueous medium in the hot-water storage tank 81a is heated. The aqueous medium sent to the hot-water air-warming unit 9a radiates heat in the heat exchange panel 91a, the walls and other indoor areas are thereby heated, and the indoor floor is heated.

The operation in the hot-water supply operation for performing only the hot-water supply operation of the first usage unit 4a is thus performed.

—Air-Cooling Operation—

In the case of performing only the air-cooling operation of the second usage unit 10a and/or the second usage unit 10b, the heat-source-side switching mechanism 23 is switched to the heat-source-side radiating operation state (indicated by solid lines in the heat-source-side switching mechanism 23 in FIG. 6), and the first usage-side flow rate adjustment valve 42a is closed in the heat-source-side refrigerant circuit 20. The switched state of the heat-source-side switching mechanism 23 as the thermoregulation mode is switched to the heat-source-side radiating operation state by one of the second usage-side controllers 108a, 108b, and an operation (the air-cooling operation) of the second usage unit 10a and/or the second usage unit 10b is performed by an operation command of the second usage-side controller 108a and/or the second usage-side controller 108b. The air-cooling operation is not described herein because it is identical to the air-cooling operation in the heat pump system 200 of the second embodiment.

—Air-Warming Operation—

In the case of performing only the air-warming operation of the second usage unit 10a and/or the second usage unit 10b, the heat-source-side switching mechanism 23 is switched to the heat-source-side evaporating operation state (indicated by dashed lines in the heat-source-side switching mechanism 23 in FIG. 6), and the intake return expansion valve 26a and the first usage-side flow rate adjustment valve 42a are closed in the heat-source-side refrigerant circuit 20. The switched state of the heat-source-side switching mechanism 23 as the thermoregulation mode is switched to the heat-source-side evaporating operation state by one of the second usage-side controllers 108a, 108b, and an operation (the air-warming operation) of the second usage unit 10a and/or the second usage unit 10b is performed by an operation command of the second usage-side controller 108a and/or the second usage-side controller 108b. The air-warming operation is not described herein because it is identical to the air-warming operation in the heat pump system 200 of the second embodiment.

—Hot-Water Supply/Air-Warming Operation—

In the case of performing the hot-water supply operation of the first usage unit 4a as well as the air-warming operation of the second usage unit 10a and/or the second usage unit 10b, the heat-source-side switching mechanism 23 is switched to the heat-source-side evaporating operation state (indicated by dashed lines in the heat-source-side switching mechanism 23 in FIG. 6), and the intake return expansion valve 26a is closed in the heat-source-side refrigerant circuit 20. In the aqueous medium circuit 80a, the aqueous-medium-side switching mechanism 161a is switched to a state in which the aqueous medium is fed to the hot-water storage unit 8a and/or the hot-water air-warming unit 9a. The switched state of the heat-source-side switching mechanism 23 as the thermoregulation mode is switched to the heat-source-side evaporating operation state by one of the second usage-side controllers 108a, 108b, an operation (the hot-water supply operation) of the first usage unit 4a (and the hot-water storage unit 8a and/or the hot-water air-warming unit 9a) is performed by an operation command of the first usage-side controller 77a, and an operation (the air-warming operation) of the second usage unit 10a and/or the second usage unit 10b is performed by an operation command of the second usage-side controller 108a and/or the second usage-side controller 108b.

In the heat-source-side refrigerant circuit 20 in such a state, the low-pressure, heat-source-side refrigerant in the refrigeration cycle is taken into the heat-source-side compressor 21 by way of the heat-source-side intake tube 21c, is compressed to high pressure in the refrigeration cycle, and is thereafter discharged to the heat-source-side discharge tube 21b. The high-pressure, heat-source-side refrigerant discharged to the heat-source-side discharge tube 21b has the refrigeration machine oil separated out in the oil separator 22a. The refrigeration machine oil separated out from the heat-source-side refrigerant in the oil separator 22a is returned to the heat-source-side intake tube 21c by way of the oil return tube 22b. A portion of the high-pressure, heat-source-side refrigerant from which the refrigeration machine oil has been separated out is sent from the heat source unit 2 to the discharge refrigerant communication tube 12 by way of the heat-source-side discharge branching tube 21d and a discharge-side shutoff valve 31, and the remainder is sent from the heat source unit 2 to the gas-refrigerant communication tube 14 by way of the heat-source-side switching mechanism 23, the second heat-source-side gas refrigerant tube 23b and the gas-side shutoff valve 30.

The high-pressure heat-source-side refrigerant sent to the gas refrigerant communication tube 14 is sent to the second usage units 10a, 10b (in this description, both of the second usage units 10a, 10b are performing the air-warming operation). The high-pressure heat-source-side refrigerant sent to the second usage units 10a, 10b is sent to the second usage-side heat exchangers 101a, 101b through the second usage-side gas refrigerant tubes 104a, 104b. The high-pressure heat-source-side refrigerant sent to the second usage-side heat exchangers 101a, 101b undergoes heat exchange in the second usage-side heat exchangers 101a, 101b with the air medium fed by the usage-side fans 105a, 105b and the refrigerant radiates heat, whereby indoor air warming is performed. Having radiated heat in the second usage-side heat exchangers 101a, 101b, the high-pressure heat-source-side refrigerant is sent from the second usage units 10a, 10b to the liquid refrigerant communication tube 13 through the second usage-side flow rate adjustment valves 102a, 102b and the second usage-side liquid refrigerant tubes 103a, 103b.

The high-pressure, heat-source-side refrigerant sent to the discharge refrigerant communication tube 12 is sent to the first usage unit 4a. The high-pressure, heat-source-side refrigerant sent to the first usage unit 4a is sent to the first usage-side heat exchanger 41a by way of the first usage-side discharge refrigerant tube 46a and the first usage-side discharge non-return valve 49a. The high-pressure, heat-source-side refrigerant sent to the first usage-side heat exchanger 41a undergoes heat exchange with the low-pressure, usage-side refrigerant in the refrigeration cycle that is circulating through the usage-side refrigerant circuit 40a and releases heat in the first usage-side heat exchanger 41a. The high-pressure, heat-source-side refrigerant having released heat in the first usage-side heat exchanger 41a is sent from the first usage unit 4a to the liquid refrigerant communication tube 13 by way of the first usage-side flow rate adjustment valve 42a and the first usage-side liquid refrigerant tube 45a.

The heat-source-side refrigerant sent from the second usage units 10a, 10b and the first usage unit 4a to the liquid refrigerant communication tube 13 is merged in the liquid refrigerant communication tube 13 and sent to the heat source unit 2. The heat-source-side refrigerant sent to the heat source unit 2 is sent to the subcooler 27 through the liquid-side shutoff valve 29. Since the heat-source-side refrigerant does not flow in the intake return tube 26, the heat-source-side refrigerant sent to the subcooler 27 is sent to the heat-source-side expansion valve 25 without undergoing heat exchange. The heat-source-side refrigerant sent to the heat-source-side expansion valve 25 is depressurized in the heat-source-side expansion valve 25 to a low-pressure gas-liquid two-phase state and sent to the heat-source-side heat exchanger 24 through the heat-source-side liquid refrigerant tube 24a. The low-pressure refrigerant sent to the heat-source-side heat exchanger 24 undergoes heat exchange in the heat-source-side heat exchanger 24 with the outdoor air fed by the heat-source-side fan 32, and the refrigerant evaporates. The low-pressure heat-source-side refrigerant evaporated in the heat-source-side heat exchanger 24 is sent to the heat-source-side accumulator 28 through the first heat-source-side gas refrigerant tube 23a and the heat-source-side switching mechanism 23. The low-pressure heat-source-side refrigerant sent to the heat-source-side accumulator 28 is again drawn into the heat-source-side compressor 21 through the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a via the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41*a* by way of the cascade-side liquid-refrigerant tube 68*a*.

In the aqueous medium circuit 80*a*, the aqueous medium circulating in the aqueous medium circuit 80*a* is heated by the heat radiation of the usage-side refrigerant in the refrigerant-water heat exchanger 65*a*. The aqueous medium heated in the refrigerant-water heat exchanger 65*a* is drawn into the circulation pump 43*a* through the first usage-side water outlet tube 48*a* and pressurized, and subsequently sent from the first usage unit 4*a* to the aqueous medium communication tube 16*a*. The aqueous medium sent to the hot-water storage unit 8*a* undergoes heat exchange in the heat exchange coil 82*a* with the aqueous medium in the hot water storage tank 81*a* and radiates heat, whereby the aqueous medium in the hot-water storage tank 81*a* is heated. The aqueous medium sent to the hot-water air-warming unit 9*a* radiates heat in the heat exchange panel 91*a*, the walls and other indoor areas are thereby heated, and the indoor floor is heated.

The operation is thus performed in the hot-water supply/air-warming operation for performing the hot-water supply operation of the first usage unit 4*a* as well as the air-warming operation of the second usage unit 10*a* and/or the second usage unit 10*b*.

—Exhaust Heat Hot-Water Supply Operation—

In the case of performing the exhaust heat hot-water supply operation for performing the hot-water supply operation of the first usage unit 4*a* as well as the air-cooling operation of the second usage unit 10*a* and/or the second usage unit 10*b*, the heat-source-side switching mechanism 23 is switched to the heat-source-side radiating operation state (indicated by the solid lines in the heat-source-side switching mechanism 23 in FIG. 6) in the heat-source-side refrigerant circuit 20. In the aqueous medium circuit 80*a*, the aqueous-medium-side switching mechanism 161*a* is switched to a state in which the aqueous medium is fed to the hot-water storage unit 8*a*. The switched state of the heat-source-side switching mechanism 23 as the thermoregulation mode is switched to the heat-source-side evaporating operation state by one of the second usage-side controllers 108*a*, 108*b*, while an operation (the hot-water supply operation) of the first usage unit 4*a* (and the hot-water storage unit 8*a* and/or the hot-water air-warming unit 9*a*) is performed by an operation command of the first usage-side controller 77*a* and an operation (the air-cooling operation) of the second usage unit 10*a* and/or the second usage unit 10*b* is performed by an operation command of the second usage-side controller 108*a* and/or the second usage-side controller 108*b*.

In the heat-source-side refrigerant circuit 20 in such a state, the low-pressure, heat-source-side refrigerant in the refrigeration cycle is taken into the heat-source-side compressor 21 by way of the heat-source-side intake tube 21*c*, is compressed to high pressure in the refrigeration cycle, and is thereafter discharged to the heat-source-side discharge tube 21*b*. The high-pressure, heat-source-side refrigerant discharged to the heat-source-side discharge tube 21*b* has the refrigeration machine oil separated out in the oil separator 22*a*. The refrigeration machine oil separated out from the heat-source-side refrigerant in the oil separator 22*a* is returned to the heat-source-side intake tube 21*c* by way of the oil return tube 22*b*. A portion of the high-pressure, heat-source-side refrigerant from which the refrigeration machine oil has been separated out is sent from the heat source unit 2 to the discharge refrigerant communication tube 12 by way of the heat-source-side discharge branching tube 21*d* and a discharge-side shutoff valve 31, and the remainder is sent to the heat-source-side heat exchanger 24 by way of the heat-source-side switching mechanism 23 and the first heat-source-side gas-refrigerant tube 23*a*. The high-pressure, heat-source-side refrigerant sent to the heat-source-side heat exchanger 24 undergoes heat exchange with outdoor air fed by the heat-source-side fan 32 and releases heat in the heat-source-side heat exchanger 24. The high-pressure, heat-source-side refrigerant having released heat in the heat-source-side heat exchanger is sent to the subcooler 27 by way of the heat-source-side expansion valve 25. The heat-source-side refrigerant sent to the subcooler 27 undergoes heat exchange with the heat-source-side refrigerant branched from the heat-source-side liquid-refrigerant tube 24*a* to the intake return tube 26 and is cooled to a subcooled state. The heat-source-side refrigerant that flows through the intake return tube 26 is returned to the heat-source-side intake tube 21*c*. The heat-source-side refrigerant cooled in the subcooler 27 is sent from the heat source unit 2 to the liquid refrigerant communication tube 13 by way of the heat-source-side liquid-refrigerant tube 24*a* and the liquid-side shutoff valve 29.

The high-pressure, heat-source-side refrigerant sent to the discharge refrigerant communication tube 12 is sent to the first usage unit 4*a*. The high-pressure, heat-source-side refrigerant sent to the first usage unit 4*a* is sent to the first usage-side heat exchanger 41*a* by way of the first usage-side discharge refrigerant tube 46*a* and the first usage-side discharge non-return valve 49*a*. The high-pressure, heat-source-side refrigerant sent to the first usage-side heat exchanger 41*a* undergoes heat exchange with the low-pressure, usage-side refrigerant in the refrigeration cycle that circulates through the usage-side refrigerant circuit 40*a* and releases heat in the first usage-side heat exchanger 41*a*. The high-pressure, heat-source-side refrigerant having released heat in the first usage-side heat exchanger 41*a* is sent from the first usage unit 4*a* to the liquid refrigerant communication tube 13 by way of the first usage-side flow rate adjustment valve 42*a* and the first usage-side liquid refrigerant tube 45*a*.

The heat-source-side refrigerant sent from the heat source unit 2 and the first usage unit 4*a* to the liquid refrigerant communication tube 13 is merged in the liquid refrigerant communication tube 13 and sent to the second usage units 10*a*, 10*b* (both the second usage units 10*a*, 10*b* are performing the air-warming operation in this description). The heat-source-side refrigerant sent to the second usage units 10*a*, 10*b* is sent to the second usage-side flow rate adjustment valves 102*a*, 102*b*. The heat-source-side refrigerant sent to the second usage-side flow rate adjustment valves 102*a*, 102*b* is depressurized in the second usage-side flow rate adjustment valves 102*a*, 102*b* to a low-pressure gas-liquid two-phase state and sent to the second usage-side heat exchangers 101*a*, 101*b* through the second usage-side liquid refrigerant tubes 103*a*, 103*b*. The low-pressure heat-source-side refrigerant sent to the second usage-side heat exchangers 101*a*, 101*b* undergoes heat exchange in the second usage-side heat exchangers 101*a*, 101*b* with the air medium fed by the usage-side fans 105*a*, 105*b* and the refrigerant evaporates, thereby performing air-cooling of the room interior. The low-pressure heat-source-side refrigerant evaporated in the second usage-side heat exchangers 101*a*, 101*b* is sent from the second usage units 10*a*, 10*b* to the gas refrigerant communication tube 14 through the second usage-side gas refrigerant tubes 104*a*, 104*b*.

The low-pressure, heat-source-side refrigerant sent to the gas-refrigerant communication tube 14 is sent to the heat source unit 2. The low-pressure, heat-source-side refrigerant sent to the heat source unit 2 is sent to the heat-source-side accumulator 28 by way of the gas-side shutoff valve 30, the second heat-source-side gas refrigerant tube 23*b*, and the heat-source-side switching mechanism 23. The low-pressure, heat-source-side refrigerant sent to the heat-source-side accumulator 28 is again taken into the heat-source-side compressor 21 by way of the heat-source-side intake tube 21c.

In the usage-side refrigerant circuit 40a, the low-pressure, usage-side refrigerant in the refrigeration cycle that is circulating through the usage-side refrigerant circuit 40a is heated and evaporated by the radiation of the heat-source-side refrigerant in the first usage-side heat exchanger 41a. The low-pressure, usage-side refrigerant evaporated in the first usage-side heat exchanger 41a is sent to the usage-side accumulator 67a by way of the second cascade-side gas-refrigerant tube 69a. The low-pressure, usage-side refrigerant sent to the usage-side accumulator 67a is taken into the usage-side compressor 62a by way of the cascade-side intake tube 71a, is compressed to high pressure in the refrigeration cycle, and is thereafter discharged to the cascade-side discharge tube 70a. The high-pressure, usage-side refrigerant discharged to the cascade-side discharge tube 70a is sent to the refrigerant/water heat exchanger 65a by way of the first cascade-side gas-refrigerant tube 72a. The high-pressure, usage-side refrigerant sent to the refrigerant/water heat exchanger 65a undergoes heat exchange with the aqueous medium being circulated through the aqueous medium circuit 80a by the circulation pump 43a and releases heat in the refrigerant/water heat exchanger 65a. The high-pressure, usage-side refrigerant having released heat in the refrigerant/water heat exchanger 65a is depressurized in the refrigerant/water heat exchange-side flow rate adjustment valve 66a to become a low-pressure gas-liquid two-phase state, and is then sent again to the first usage-side heat exchanger 41a by way of the cascade-side liquid-refrigerant tube 68a.

In the aqueous medium circuit 80a, the aqueous medium circulating in the aqueous medium circuit 80a is heated by the heat radiation of the heat-source-side refrigerant in the first usage-side heat exchanger 41a. The aqueous medium heated in the first usage-side heat exchanger 41a is drawn into the circulation pump 43a through the first usage-side water outlet tube 48a and pressurized, and subsequently sent from the first usage unit 4a to the aqueous medium communication tube 16a. The aqueous medium sent to the aqueous medium communication tube 16a is sent to the hot-water storage unit 8a and/or the hot-water air-warming unit 9a through the aqueous-medium-side switching mechanism 161a. The aqueous medium sent to the hot-water storage unit 8a undergoes heat exchange in the heat exchange coil 82a with the aqueous medium in the hot-water storage tank 81a, heat is radiated, and the aqueous medium in the hot-water storage tank 81a is thereby heated.

The operation in the exhaust heat hot-water supply operation for performing the hot-water supply operation of the first usage unit 4a as well as the air-cooling operation of the second usage unit 10a and/or the second usage unit 10b is thus performed.

Thus, in this heat pump system 400 as well, similar to the heat pump system 300 of the third embodiment, thermoregulation mode switching control is performed, whereby operation is switched to a thermoregulation mode different from the switched state of the heat-source-side switching mechanism 23 as the thermoregulation mode commanded by one of the second usage-side controllers 108a, 108b (the second usage-side controller 108a in this case) which issue commands to the second usage units 10a, 10b. The thermoregulation mode switching control is not described herein because it is identical to the thermoregulation mode switching control in the heat pump system 300 of the third embodiment (see FIG. 5 and others).

It is thereby possible in this heat pump system 400 as well to achieve the same operational effects as the heat pump system 300 of the third embodiment.

Other Embodiments

Embodiments of the present invention were described above based on the drawings, but the specific configuration is not limited to these embodiments, and alterations can be made within a range that does not deviate from the scope of the invention.

<A>

Figure 7:
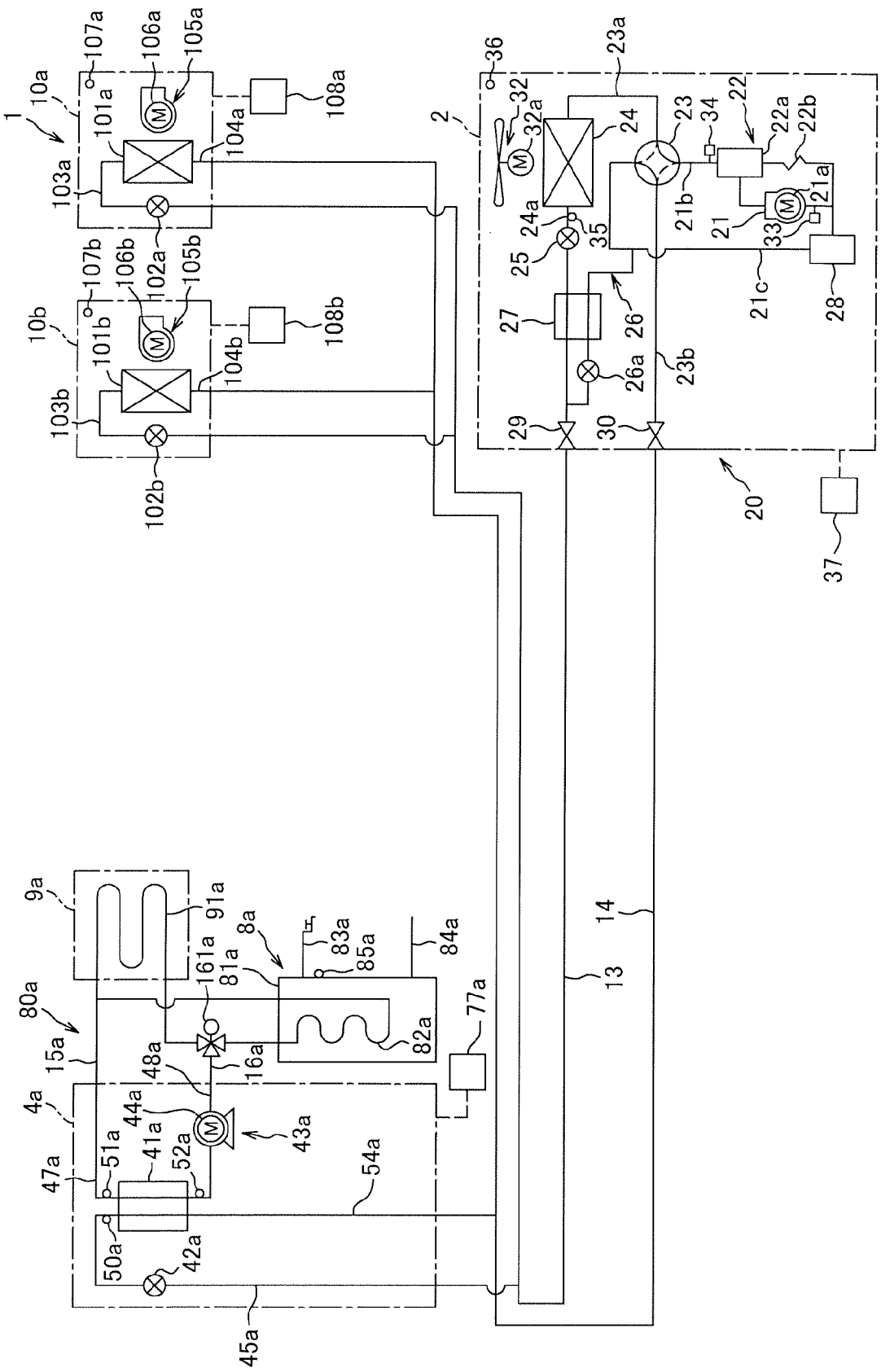
FIG. 7 is a schematic structural diagram of a heat pump system according to another embodiment of the present invention.

In the heat pump systems, 1, 200, 300, 400 described above (see FIGS. 1, 3, 4, 6), switching of the thermoregulation mode is performed by one of the second usage-side controllers 108a, 108b, but since it is essentially preferable that it be possible to switch operation to a different thermoregulation mode from the commanded thermoregulation mode, switching of the thermoregulation mode may be performed by the first usage-side controller 77a, and, as shown in FIG. 7, for example, a centralized controller 37 may be provided separately from the first usage-side controller 77a and the second usage-side controllers 108a, 108b and switching of the thermoregulation mode may be performed by this centralized controller 37. The purpose of the centralized controller 37 herein is not to perform control settings or operation commands of an individual usage unit such as the first usage unit 4a and/or the second usage units 10a, 10b, but rather to perform shared control settings and operation commands shared by the entire heat pump system, including switching of the thermoregulation mode.

However, when switching of the thermoregulation mode is performed by the centralized controller 37 and the thermoregulation mode is left switched to the heat-source-side evaporating operation state, for example, whenever the air-cooling operation of the second usage units 10a, 10b is performed under operating conditions such as summer when the air-cooling operation is needed, the thermoregulation mode is switched to the heat-source-side radiating operation state. When the thermoregulation mode is left switched to the heat-source-side radiating operation state, whenever the air-warming operation of the second usage units 10a, 10b is performed under operating conditions such as winter when the air-warming operation is needed, the thermoregulation mode is switched to the heat-source-side evaporating operation state and switching of the thermoregulation mode is performed frequently. When switching of the thermoregulation mode is performed by the first usage-side controller 77a, the thermoregulation mode is usually left switched to the heat-source-side evaporating operation state; therefore, whenever the air-cooling operation of the second usage units 10a, 10b is performed under operating conditions such as summer when the air-cooling operation is needed, the thermoregulation mode is switched to the heat-source-side radiating operation state and switching of the thermoregulation mode is performed frequently. Thus, when switching of the thermoregulation mode is performed by the first usage-side controller 77a or the centralized controller 37, there is a chance that switching of the thermoregulation mode will be performed frequently, which is undesirable.

In view of this, when switching of the thermoregulation mode is designed to be performed by the second usage-side controllers 108a, 108b, the thermoregulation mode is kept switched to the heat-source-side radiating operation state under operating conditions such as summer when the air-cooling operation is needed, the thermoregulation mode is kept switched to the heat-source-side evaporating operation state under operating conditions such as winter when the air-warming operation is needed, and switching of the thermoregulation mode can be prevented from being performed frequently.

Therefore, if the only consideration is to make it possible to switch operation to a different thermoregulation mode from the commanded thermoregulation mode, essentially, switching of the thermoregulation mode may be performed by either the first usage-side controller 77a, the second usage-side controllers 108a, 108b, or the centralized controller 37, but if the frequency of thermoregulation mode switching is also a matter of consideration, switching of the thermoregulation mode is preferably performed by the second usage-side controllers 108a, 108b as it is in the heat pump systems 1, 200, 300, 400 described above (see FIGS. 1, 3, 4, 6).

<B>

In the heat pump systems 1, 200, 300, 400 described above (see FIGS. 1, 3, 4, and 6), one first usage unit 4a and two second usage units 10a, 10b are connected to the heat source unit 2 via the refrigerant communication tubes 13, 14 or other components, but the heat pump system is not limited to this configuration, and there may be a plurality of first usage units, and there may be one, three, or more second usage units.

<C>

In the heat pump systems 200, 400 according to the second and fourth embodiments, HFC-134a is used as the usage-side refrigerant, but the usage-side refrigerant is not limited to HFC-134a and may be HFO-1234yf (2,3,3,3-tetrafluoro-1-propene) or another refrigerant whose pressure corresponding to a saturated gas temperature of 65° C. is a high pressure of 2.8 MPa or less at gauge pressure, and preferably 2.0 MPa or less, for example.

INDUSTRIAL APPLICABILITY

If the present invention is used, it is possible to ensure that a switch will be made to a thermoregulation mode suitable for the desired operation in a heat pump system in which a usage unit for performing a hot-water supply operation of heating an aqueous medium and a usage unit for performing cooling and heating of an air medium are both connected to a shared heat source unit.

What is claimed is:

1. A heat pump system comprising:
a heat source unit having
  a compressor arranged to compress a refrigerant,
  a heat-source-side heat exchanger, and
  a heat-source-side switching mechanism switchable between
    a radiating operation state in which the heat-source-side heat exchanger functions as a radiator of refrigerant and
    an evaporating operation state in which the heat-source-side heat exchanger functions as an evaporator of refrigerant;
a first usage unit operable to perform a hot-water supply operation in which an aqueous medium is heated by heat radiation of refrigerant in a first usage-side heat exchanger, the first usage unit being connected to the heat source unit with the first usage-side heat exchanger functioning as a radiator of refrigerant when the heat-source-side switching mechanism is in the evaporating operation state; and
a second usage unit operable to perform
  an air-cooling operation in which an air medium is cooled by the evaporation of refrigerant in a second usage-side heat exchanger, and
  an air-warming operation in which the air medium is heated by the heat radiation of the refrigerant in the second usage-side heat exchanger,
the second usage unit being connected to the heat source unit with the second usage-side heat exchanger functioning
  as an evaporator of refrigerant when the heat-source-side switching mechanism is in the radiating operation state and
  as a radiator of refrigerant when the heat-source-side switching mechanism is in the evaporating operation state,
the first usage unit and the second usage unit being incapable of individually selecting and performing the hot-water supply operation, the air-cooling operation, or the air-warming operation, and
the heat pump system being capable of switching to and operating in a thermoregulation mode different from the switched state of the heat-source-side switching mechanism in response to a thermoregulation mode command issued by
  a first usage-side controller configured to issue commands to the first usage unit,
  a second usage-side controller configured to issue commands to the second usage unit, or
  a centralized controller that is separate from the first usage-side controller and the second usage-side controller.

2. The heat pump system according to claim 1, wherein
when a command to perform the hot-water supply operation is issued from the first usage-side controller to the first usage unit while the thermoregulation mode is in the radiating operation state, the thermoregulation mode is switched to the evaporating operation state and a priority hot-water supply operation is performed, which is an operation in which a hot-water supply operation of the first usage unit is performed.

3. The heat pump system according to claim 2, wherein
the air-cooling operation of the second usage unit is prohibited during the priority hot-water supply operation.

4. The heat pump system according to claim 3, wherein
the second usage unit has a usage-side fan arranged to feed an air medium to the second usage-side heat exchanger; and
the usage-side fan is operated in the second usage unit while the air-cooling operation has been stopped during the priority hot-water supply operation when the second usage unit has received a command to perform the air-cooling operation from the second usage-side controller.

5. The heat pump system according to claim 4, wherein
the second usage-side controller continues a display stating that the air-cooling operation is in effect even while the air-cooling operation of the second usage unit has stopped during the priority hot-water supply operation.

6. The heat pump system according to claim 1, wherein
switching of the thermoregulation mode is performed based on at least one of a commanded thermoregulation mode and an outside air temperature.

7. The heat pump system according to claim 1, wherein
the first usage unit is connected to the heat source unit so that when the heat-source-side switching mechanism is in the radiating operation state,
  the second usage-side heat exchanger is operable as an evaporator of refrigerant and
  the first usage-side heat exchanger is operable as a radiator of refrigerant.

8. The heat pump system according to claim 1, wherein switching of the thermoregulation mode is performed by the second usage-side controller.

9. The heat pump system according to claim 6, wherein the first usage unit is connected to the heat source unit so that when the heat-source-side switching mechanism is in the radiating operation state,
   the second usage-side heat exchanger is operable as an evaporator of refrigerant and
   the first usage-side heat exchanger is operable as a radiator of refrigerant.

10. The heat pump system according to claim 6, wherein switching of the thermoregulation mode is performed by the second usage-side controller.

11. The heat pump system according to claim 7, wherein switching of the thermoregulation mode is performed by the second usage-side controller.

12. The heat pump system according to claim 2, wherein switching of the thermoregulation mode is performed based on at least one of a commanded thermoregulation mode and an outside air temperature.

13. The heat pump system according to claim 2, wherein the first usage unit is connected to the heat source unit so that when the heat-source-side switching mechanism is in the radiating operation state,
    the second usage-side heat exchanger is operable as an evaporator of refrigerant and
    the first usage-side heat exchanger is operable as a radiator of refrigerant.

14. The heat pump system according to claim 2, wherein switching of the thermoregulation mode is performed by the second usage-side controller.

15. The heat pump system according to claim 3, wherein switching of the thermoregulation mode is performed based on at least one of a commanded thermoregulation mode and an outside air temperature.

16. The heat pump system according to claim 3, wherein the first usage unit is connected to the heat source unit so that when the heat-source-side switching mechanism is in the radiating operation state,
    the second usage-side heat exchanger is operable as an evaporator of refrigerant and
    the first usage-side heat exchanger is operable as a radiator of refrigerant.

17. The heat pump system according to claim 3, wherein switching of the thermoregulation mode is performed by the second usage-side controller.

* * * * *